United States Patent
Loya et al.

(10) Patent No.: US 11,747,470 B2
(45) Date of Patent: Sep. 5, 2023

(54) ROTATION ANGLE SENSING AND CONTROL OF MIRROR ASSEMBLY FOR LIGHT STEERING

(71) Applicant: Beijing Voyager Technology Co., Ltd., Beijing (CN)

(72) Inventors: Sergio Fabian Almeida Loya, Mountain View, CA (US); Youmin Wang, Mountain View, CA (US)

(73) Assignee: Beijing Voyager Technology Co., Ltd., Beijing (CN)

(*) Notice: Subject to any disclaimer, the term of this patent is extended or adjusted under 35 U.S.C. 154(b) by 242 days.

(21) Appl. No.: 17/112,126

(22) Filed: Dec. 4, 2020

(65) Prior Publication Data
US 2022/0179070 A1    Jun. 9, 2022

(51) Int. Cl.
*G01S 17/02* (2020.01)
*G02B 26/08* (2006.01)
*G01S 7/481* (2006.01)

(52) U.S. Cl.
CPC .......... *G01S 17/02* (2013.01); *G02B 26/0833* (2013.01); *G01S 7/4817* (2013.01)

(58) Field of Classification Search
CPC ........ G01S 17/02; G01S 7/4817; G01S 17/42; G02B 26/0833
See application file for complete search history.

(56) References Cited

U.S. PATENT DOCUMENTS

2006/0076947 A1\* 4/2006 Berkcan ............... G01R 15/207
                                                                324/126
2020/0225329 A1\* 7/2020 Wang ................... G05D 1/0231

\* cited by examiner

*Primary Examiner* — Hwa Andrew Lee
(74) *Attorney, Agent, or Firm* — KILPATRICK TOWNSEND & STOCKTON, LLP

(57) ABSTRACT

In one example, a semiconductor integrated circuit is provided. The semiconductor integrated circuit includes a microelectromechanical system (MEMS), a substrate on which the MEMS is formed, and a controller, the MEMS including one or more micro-mirror assemblies, each micro-mirror assembly including: a micro-mirror comprising a first connection structure and a second connection structure, the first connection structure being connected to the substrate at a first pivot point, the second connection structure being connected to the substrate at a second pivot point; an actuator configured to rotate the micro-mirror; and a measurement circuit configured to measure an electrical resistance of at least one of the first connection structure or the second connection structure. The controller is configured to control the actuator of each of the one or more micro-mirror assemblies based on the electrical resistance measurements from the measurement circuits.

20 Claims, 18 Drawing Sheets

302a

ROTATION ANGLE SENSING AND CONTROL OF MIRROR ASSEMBLY FOR LIGHT STEERING

BACKGROUND

Light steering typically involves the projection of light in a predetermined direction to facilitate, for example, the detection and ranging of an object, the illumination and scanning of an object, or the like. Light steering can be used in many different fields of applications, including, for example, autonomous vehicles and medical diagnostic devices.

Light steering can be performed in both transmission and reception of light. For example, a light steering system may include a micro-mirror array to control the projection direction of light to detect/image an object. Moreover, a light steering receiver may also include a micro-mirror array to select a direction of incident light to be detected by the receiver to avoid detecting other unwanted signals. The micro-mirror array may include an array of micro-mirror assemblies, with each micro-mirror assembly comprising a micro-mirror and an actuator. In a micro-mirror assembly, a micro-mirror can be connected to a substrate via a connection structure (e.g., a torsion bar, a spring) to form a pivot, and the micro-mirror can be rotated around the pivot by the actuator. Each micro-mirror can be rotated by a rotation angle to reflect (and steer) light from a light source towards a target direction. Each micro-mirror can be rotated by the actuator to provide a first range of angles of projection along a vertical axis and to provide a second range of angles of projection along a horizontal axis. The first range and the second range of angles of projection can define a two-dimensional field of view (FOV) in which light is to be projected to detect/scan an object. The FOV can also define the direction of incident lights, reflected by the object, to be detected by the receiver.

Ideally, all micro-mirror assemblies of a micro-mirror array are identical, and the micro-mirror in each micro-mirror assembly can be controlled to rotate uniformly by a target rotation angle in response to a control signal. However, due to variations in the fabrication process, as well as other non-idealities, the control precision of the micro-mirror may become degraded, such that a micro-mirror of a micro-mirror assembly may not rotate by the exact target rotation angle in response to the control signal. Moreover, different micro-mirrors of the micro-mirror array may rotate by different angles in response to the same control signal. All these can degrade the uniformity of the rotations among the micro-mirrors. Therefore, it is desirable to improve the control precision of the micro-mirror to improve the uniformity of rotations among the micro-mirrors.

BRIEF SUMMARY

In one example, an apparatus is provided. The apparatus comprises a light detection and ranging (LiDAR) module. The the LiDAR module includes a semiconductor integrated circuit, the semiconductor integrated circuit including a microelectromechanical system (MEMS), a substrate on which the MEMS is formed, and a controller. The MEMS including one or more micro-mirror assemblies. Each micro-mirror assembly includes a micro-mirror, an actuator, and a measurement circuit. The micro-mirror comprises a first connection structure and a second connection structure, the first connection structure being connected to the substrate at a first pivot point, the second connection structure being connected to the substrate at a second pivot point. The actuator is configured to rotate the micro-mirror to reflect light emitted by a light source out of the LiDAR module or to reflect light received by the LiDAR module to a receiver. The measurement circuit is electrically connected to at least one of the first connection structure or the second connection structure, the measurement circuit being configured to measure an electrical resistance of at least one of the first connection structure or the second connection structure. The controller is configured to, for each micro-mirror assembly: determine a first signal based on a target rotation angle of the micro-mirror; transmit the first signal to the actuator of the micro-mirror assembly; obtain, from the measurement circuit, a measurement of the electrical resistance of at least one of the first connection structure or the second connection structure; determine, based on the measurement of the electrical resistance, an actual rotation angle of the micro-mirror in response to the first signal; determine a second signal based on a relationship between the target rotation angle and the actual rotation angle; and transmit the second signal to the actuator of the micro-mirror assembly. The second signal causes the micro-mirror to rotate by the target rotation angle.

In some aspects, the substrate comprises a pair of electrical contacts on two sides of the first pivot point and the second pivot point. The measurement circuit is electrically connected to at least one of the first connection structure or the second connection structure via one or more of the pair of electrical contacts.

In some aspects, the measurement circuit comprises a network of resistors comprising a reference resistor. The measurement circuit further comprises a stimulus generator configured to supply a stimulus voltage to the network of resistors to generate a voltage output representing the measurement based on a relationship between the electrical resistance of at least one of the first connection structure or the second connection structure and an electrical resistance of the reference resistor.

In some aspects, the network of resistors and at least one of the first connection structure or the second connection structure form a bridge structure.

In some aspects, the stimulus generator is configured to generate a pulse-width modulation (PWM) signal as the stimulus voltage, the PWM signal having periodic on times and off times. The controller is configured to determine the actual rotation angle of the micro-mirror based on the measurement obtained during the on times of the PWM signal.

In some aspects, the measurement circuit includes: an amplifier configured to amplify the voltage output; an analog-to-digital converter (ADC) configured to convert the amplified voltage output to a digital value; a mapping table that maps multiple digital values to multiple rotation angles; and an output circuit configured to: access the mapping table to retrieve the actual rotation angle mapped to the digital value; and output the retrieved actual rotation angle.

In some aspects, the measurement circuit is configured to measure the electrical resistance of the first connection structure and the second connection structure.

In some aspects, neither the first connection structure nor the second connection structure is coated with a layer of metal.

In some aspects, the measurement circuit is configured to measure the electrical resistance of the first connection structure.

In some aspects, the first connection structure is not coated with a layer of metal. The second connection structure is coated with a layer of metal.

In some aspects, the controller is configured to generate the second signal based on adjusting at least one of: a frequency of the first signal or an amplitude of the first signal.

In some aspects, the actuator includes one of: an electrostatic actuator, an electromagnetic actuator, or a piezoelectric actuator.

In some aspects, the controller is configured to: control the actuator of each micro-mirror assembly of the array of micro-mirror assemblies to rotate the micro-mirror of the respective micro-mirror assembly by the target rotation angle to set one of: an input path of light to a receiver or an output projection path of light from a light source.

In some aspects, the light source includes a pulsed light source. The target rotation angle is a first target rotation angle. The controller is configured to: control the light source to generate a first light pulse at a first time; control the actuator to set a first angle of the output projection path based on the first target rotation angle of the micro-mirror to project the first light pulse towards an object along the output projection path; control the actuator of each micro-mirror assembly to set a second angle of the input path based on a second target rotation angle of the micro-mirror to steer a second light pulse reflected from the object to the receiver, the second light pulse being received at the receiver at a second time; and determine a location of the object with respect to the apparatus based on a difference between the first time and the second time, as well as on the first angle and the second angle.

In some examples, a method is provided. The method comprises: determining a first signal based on a target rotation angle of a micro-mirror of a micro-mirror assembly, the micro-mirror assembly being part of an MEMS implemented on a substrate, the micro-mirror comprising a first connection structure and a second connection structure, the first connection structure being connected to the substrate at a first pivot point, the second connection structure being connected to the substrate at a second pivot point; transmitting the first signal to the actuator of the micro-mirror assembly to rotate the micro-mirror by the target rotation angle; obtaining, from a measurement circuit, a measurement of an electrical resistance of at least one of the first connection structure or the second connection structure; determining, based on the measurement of the electrical resistance, an actual rotation angle of the micro-mirror in response to the first signal; determining a second signal based on the first signal and based on a relationship between the actual rotation angle and the target rotation angle; and transmitting the second signal to the actuator of the micro-mirror assembly. The second signal causes the micro-mirror to rotate by the target rotation angle.

In some aspects, the method further comprises: measuring, using the measurement circuit and via a pair of electrical contacts on two sides of the first pivot point and the second pivot point, the electrical resistance of at least one of the first connection structure or the second connection structure.

In some aspects, the measurement circuit comprises a network of resistors comprising a reference resistor, and a stimulus generator. The method further comprises controlling the stimulus generator to supply a stimulus voltage to the network of resistors, the stimulus voltage causing the network of resistors to generate a voltage output representing the measurement based on a relationship between the electrical resistance of at least one of the first connection structure or the second connection structure, and an electrical resistance of the reference resistor.

In some aspects, the method further comprises controlling the stimulus generator to generate a PWM signal as the stimulus voltage, the PWM signal having periodic on times and off times. The actual rotation angle of the micro-mirror is determined based on the measurement obtained during the on times of the PWM signal.

In some aspects, the measurement of the electrical resistance of one of the first connection structure or the second connection structure is obtained.

In some examples, a non-transitory computer-readable medium is provided. The non-transitory computer-readable medium stores instructions which, when executed by a hardware processor, causes the hardware processor to: determine a first signal based on a target rotation angle of a micro-mirror of a micro-mirror assembly, the micro-mirror assembly being part of an MEMS implemented on a substrate, the micro-mirror comprising a first connection structure and a second connection structure, the first connection structure being connected to the substrate at a first pivot point, the second connection structure being connected to the substrate at a second pivot point; transmit the first signal to the actuator of the micro-mirror assembly to rotate the micro-mirror by the target rotation angle; obtain, from a measurement circuit, a measurement of an electrical resistance of at least one of the first connection structure or the second connection structure; determine, based on the measurement of the electrical resistance, an actual rotation angle of the micro-mirror in response to the first signal; determine a second signal based on the first signal and based on a relationship between the actual rotation angle and the target rotation angle; and transmit the second signal to the actuator of the micro-mirror assembly. The second signal causes the micro-mirror to rotate by the target rotation angle.

BRIEF DESCRIPTION OF THE DRAWINGS

The detailed description is set forth with reference to the accompanying figures.

DETAILED DESCRIPTION

Figure 1:
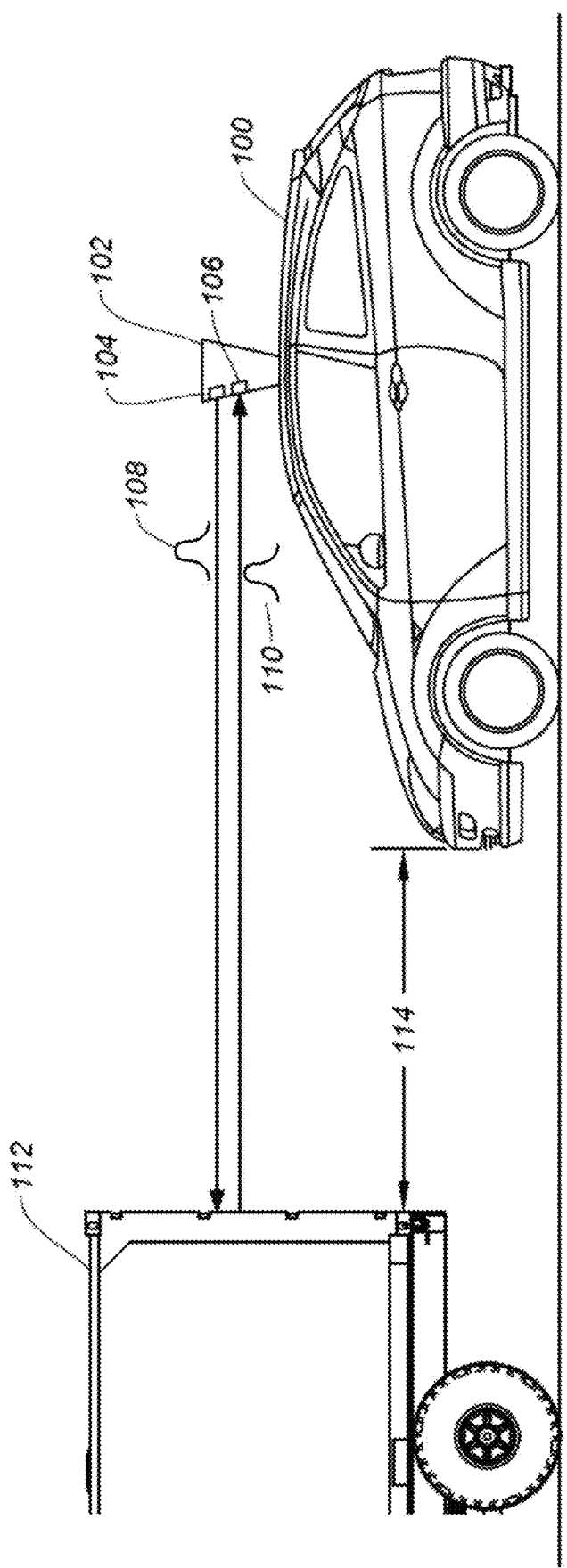
FIG. 1 shows an autonomous driving vehicle utilizing aspects of certain embodiments of the disclosed techniques herein.

In the following description, various examples of an adaptive control system of a micro-mirror array will be described. The adaptive control system can adjust the control signals for each micro-mirror of the array based on a measurement of an instantaneous rotation angle of the micro-mirror, and a difference (if any) between the instantaneous rotation angle and the target rotation angle of the micro-mirror. For purposes of explanation, specific configurations and details are set forth to provide a thorough understanding of the embodiments. However, it will be apparent to one skilled in the art that certain embodiments may be practiced or implemented without every detail disclosed. Furthermore, well-known features may be omitted or simplified to prevent any obfuscation of the novel features described herein.

Light steering can be found in different applications. For example, a light detection and ranging (LiDAR) module of a vehicle may include a light steering system. The light steering system can be part of the transmitter to steer light towards different directions to detect obstacles around the vehicle and to determine the distances between the obstacles and the vehicle, which can be used for autonomous driving. Moreover, a receiver may also include a micro-mirror array to select a direction of incident light to be detected by the receiver to avoid detecting other unwanted signals. Further, the headlight of a manually driven vehicle can include the light steering system, which can be controlled to focus light towards a particular direction to improve visibility for the driver. In another example, optical diagnostic equipment, such as an endoscope, can include a light steering system to steer light in different directions onto an object in a sequential scanning process to obtain an image of the object for diagnosis.

Light steering can be implemented by way of a micro-mirror array. The micro-mirror array can have an array of micro-mirror assemblies, with each micro-mirror assembly having a movable micro-mirror and an actuator (or multiple actuators). The micro-mirrors and actuators can be formed as MEMS on a semiconductor substrate, which allows integration of the MEMS with other circuitries (e.g., controller, interface circuits) on the semiconductor substrate. In a micro-mirror assembly, a micro-mirror can be connected to the semiconductor substrate via a pair of connection structures (e.g., a torsion bar, a spring) to form a pair of pivots. The actuator can rotate the micro-mirror around the pair of pivots, with the connection structure deformed to accommodate the rotation. The array of micro-mirrors can receive incident light beam, and each micro-mirror can be rotated at a common rotation angle to project/steer the incident light beam at a target direction. Each micro-mirror can be rotated around two orthogonal axes to provide a first range of angles of projection along a vertical dimension and to provide a second range of angles of projection along a horizontal dimension. The first range and the second range of angles of projection can define a two-dimensional field of view (FOV) in which light is to be projected to detect/scan an object. The FOV can also define the direction of incident lights, reflected by the object, that are to be detected by the receiver.

Compared with using a single mirror to steer the incident light, a micro-mirror array can provide a comparable or even larger aggregate reflective surface area. With a larger reflective surface area, incident light with a larger beam width can be projected onto the micro-mirror array for the light steering operation, which can mitigate the effect of dispersion and can improve the imaging/ranging resolution. Moreover, each individual micro-mirror has a smaller size and mass, which can lessen the burdens on the actuators that control those micro-mirrors and can improve reliability. Further, the actuators can rotate the micro-mirrors by a larger rotation angle for a given torque, which can improve the FOV of the micro-mirror array.

For both single-mirror and micro-mirror array, the control precision can substantially affect their performances. Specifically, an actuator may receive a control signal designed to rotate a mirror (or a micro-mirror) by a target rotation angle, but due to limited control precision, the actuator may be unable to rotate the mirror exactly by that target rotation angle. As a result, the mirror may be unable to rotate over a desired range of angle, which can reduce the achievable FOV. Moreover, due to the limited control precision, the rotation angles of each micro-mirror in the array also vary. The non-uniformity in the rotation angles of the micro-mirrors can increase the dispersion of the reflected light and reduce the imaging/ranging resolution.

The control precision limitation can come from various sources, such as, for example, variations in the fabrication process and non-idealities in the actuator and/or in the transmission of the control signal. Specifically, the control signal can be determined based on a required torque for a target rotation angle, and the required torque may be determined based on a predetermined spring stiffness of the connection structures. The actual spring stiffness may depend on the dimension of the connection structures, which may vary due to variations in the fabrication process. As a result, the predetermined spring stiffness may not match the actual spring stiffness. As another example, the actuator may not create the target torque in response to the control signal due to various non-idealities. For example, due to electrical resistance of the transmission paths of the control signal, the amplitude of the control signal can be reduced when it arrives at the actuator. In all these cases, the actual rotation angle of the micro-mirror may not match the target rotation angle, which leads to degradation in the control precision of the micro-mirror.

Conceptual Overview of Certain Embodiments

Figure 2A:
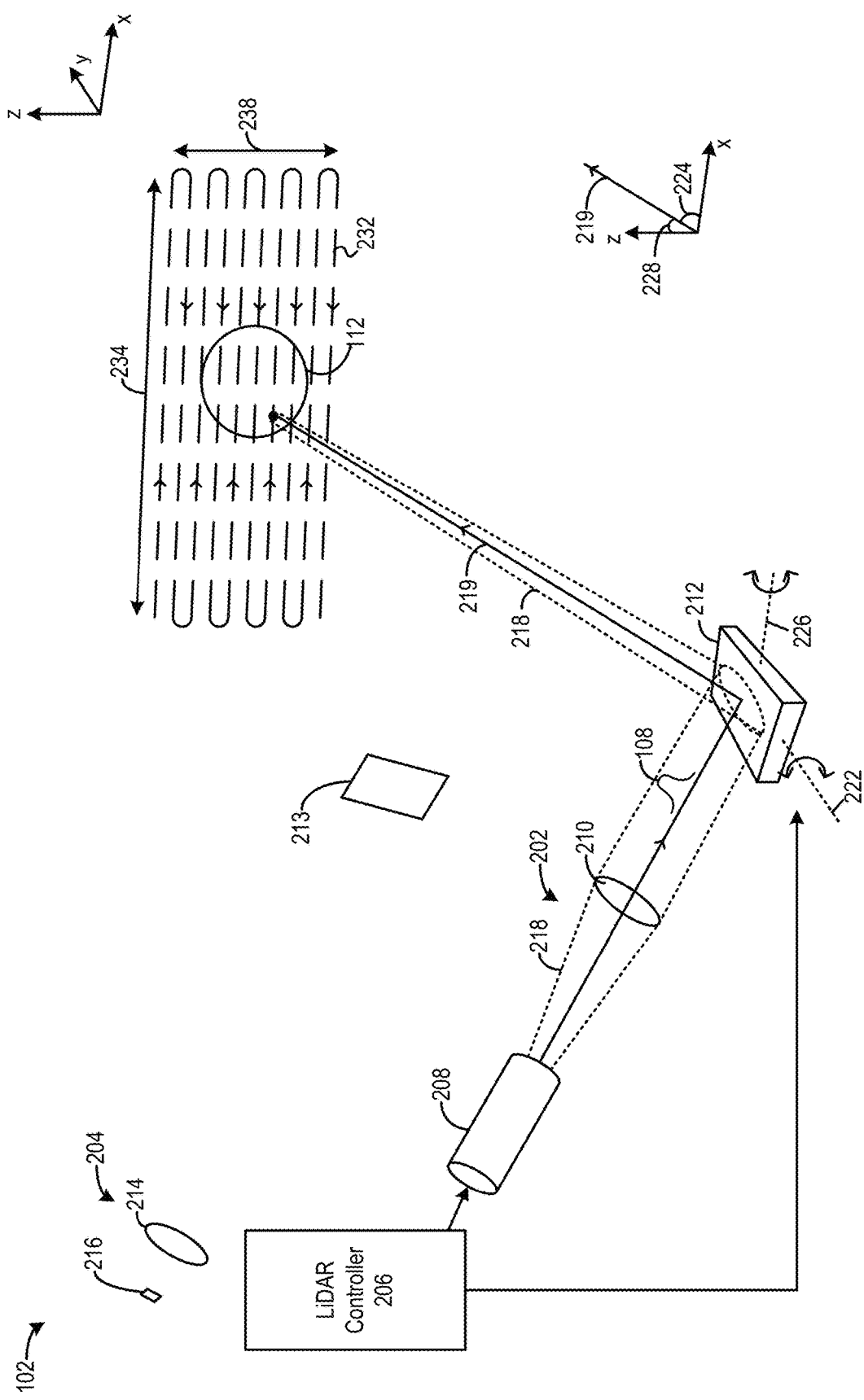
FIG. 2A, FIG. 2B, FIG. 2C, FIG. 2D, and FIG. 2E illustrate examples of a light steering system, according to examples of the present disclosure.
Figure 2B:
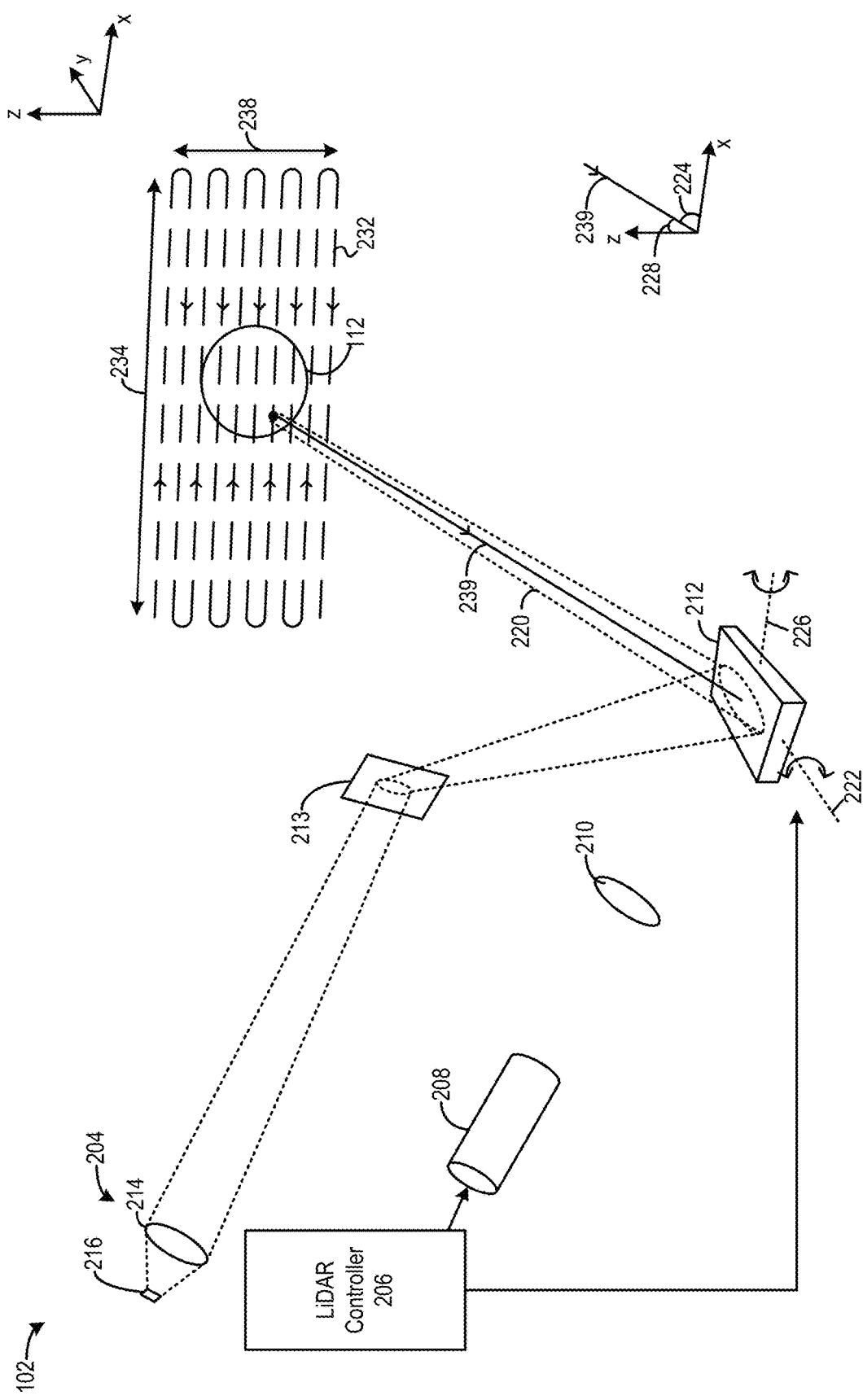

Examples of the present disclosure relate to a light steering system that can address the problems described above. As shown in FIG. 2A and FIG. 2B, the light steering system can be used as part of a transmitter to control a direction of projection of output light. The light steering system can also be used as part of a receiver to select a direction of input light to be detected by the receiver. The light steering system can also be used in a coaxial configuration such that the light steering system can project output light to a location and detects light reflected from that location. Various embodiments of the light steering can include a plurality of mirrors to perform light steering, such as those shown and described below with respect to FIG. 2C.

Figure 2D:
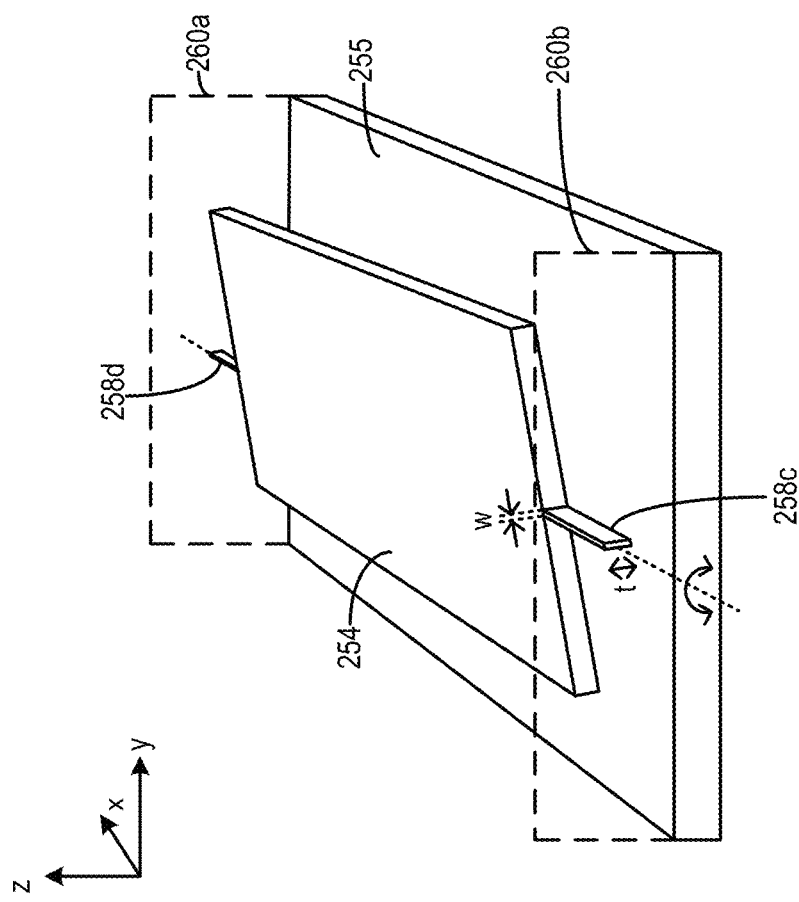
Figure 2D:
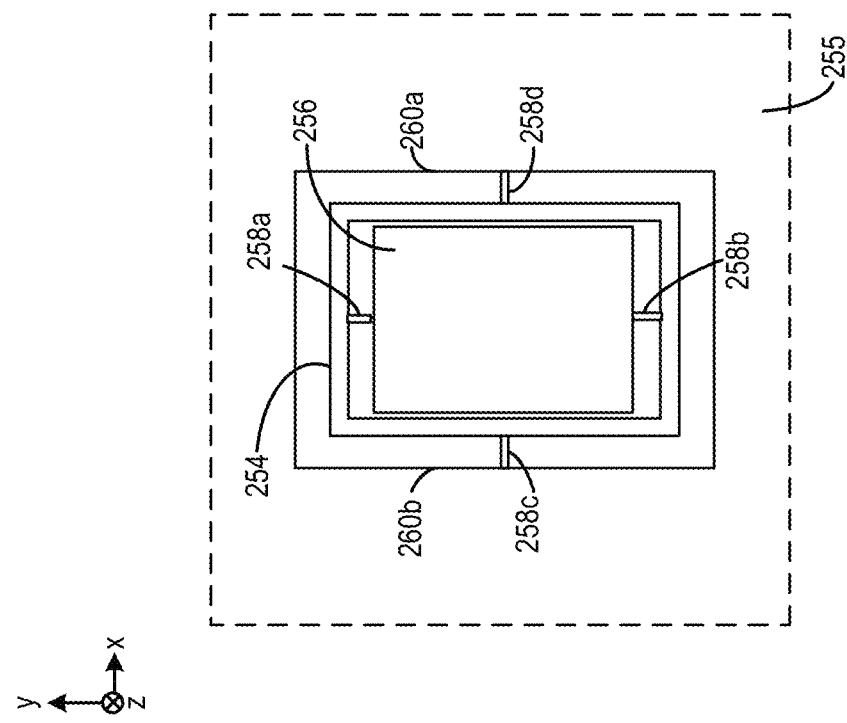
Figure 3A:
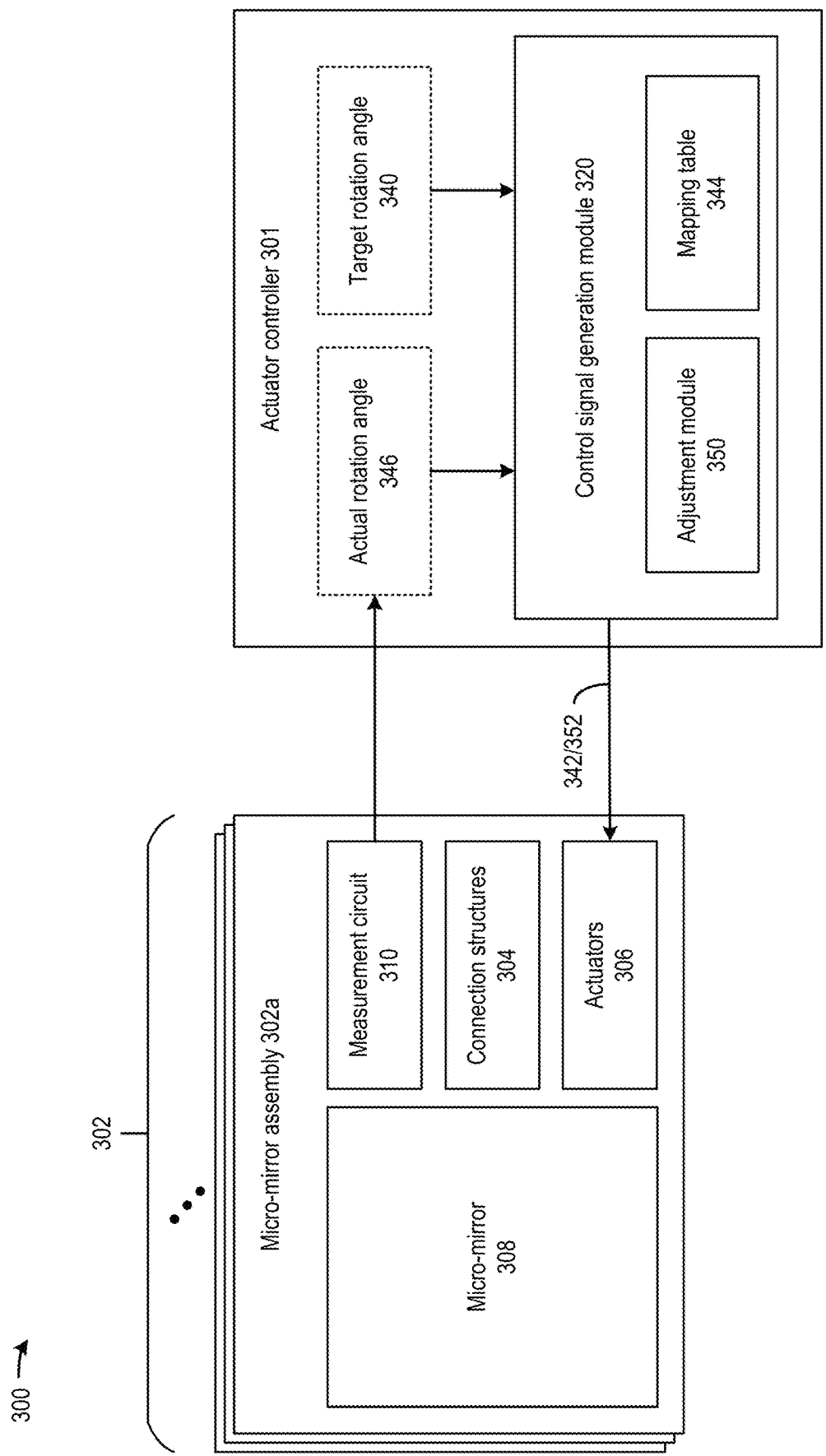
FIG. 3A, FIG. 3B, and FIG. 3C illustrate other examples of a light steering system and its operation, according to examples of the present disclosure.
Figure 3B:
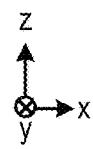
Figure 3B:
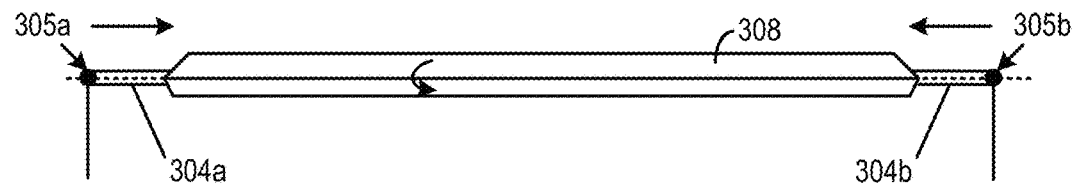
Figure 3B:
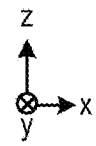
Figure 3B:
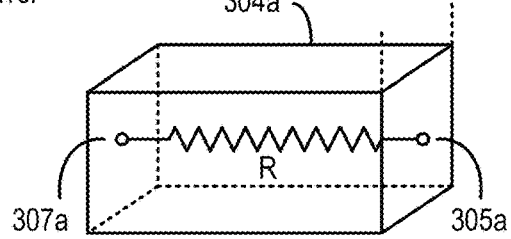

In some examples, a light steering system includes a semiconductor integrated circuit. The semiconductor integrated circuit includes an MEMS and substrate on which the MEMS is formed. An example of the semiconductor integrated circuit is shown in FIG. 3A and FIG. 3B. The MEMS includes an array of micro-mirror assemblies. Each micro-mirror assembly includes a micro-mirror, an actuator, and a measurement circuit. The micro-mirror includes a first connection structure and a second connection structure, the first connection structure being connected to the substrate at a first pivot point and the second connection structure being connected to the substrate at a second pivot point. In some examples, referring to FIG. 2D, the micro-mirror includes a gimbal/frame that surrounds a light-reflecting surface, and first and second connection structures connect between the gimbal and the substrate. The actuator is configured to rotate the micro-mirror around the first pivot point and the second pivot point. The actuator rotates the micro-mirror via, for example, an electrostatic force (e.g., a comb drive) or a mechanical push/pull force (e.g., a piezoelectric device). The measurement circuit is electrically connected to at least one of the first connection structure or the second connection structure and is configured to measure an electrical resistance of at least one of the first connection structure or the second connection structure.

The semiconductor integrated circuit further includes a controller. The controller is configured to, for each micro-mirror assembly, determine a first signal based on a target rotation angle of the micro-mirror and transmit the first signal to the actuator of the micro-mirror assembly. Upon transmission of the first signal, the controller can obtain, from the measurement circuit, a measurement of the electrical resistance of at least one of the first connection structure or the second connection structure. The controller can determine, based on the measurement of the electrical resistance, an actual rotation angle of the micro-mirror in response to the first signal. The controller can then determine a second signal based on the first signal and based on a relationship between the target rotation angle and the actual rotation angle, and transmit the second signal to the actuator of the micro-mirror assembly to cause the micro-mirror to rotate by the target rotation angle.

Specifically, each of the first and second connection structures may include a torsion bar, a spring, etc., and is deformable to accommodate the rotation of the micro-mirror. The deformation can create different stresses (e.g., normal stress, shear stress) in the connection structures, which can change the electrical resistance of the connection structures. The degrees of stresses, as well as the resultant changes in the electrical resistance, can reflect the actual rotation angle of the micro-mirror. The controller can implement a feedback loop, in which the controller can determine, based on the electrical resistance measurement result provided by the measurement circuit, the actual rotation angle of the micro-mirror, and generate the second signal based on adjusting the first signal to reduce a difference between the actual rotation angle and the target rotation angle, until the difference is below a threshold. In some examples, the adjustment of the first signal can include adjusting an amplitude of the first signal to adjust the torque provided by the actuator. In some examples, the micro-mirror may be rotated according to a periodic pattern. For example, the micro-mirror can be rotated at a frequency close to a natural frequency between a range of angles to induce harmonic resonance, which allows substantial reduction in the required torque to achieve a target FOV. In such a case, the adjustment of the first signal can include adjusting the frequency of the first signal.

Figure 4A:
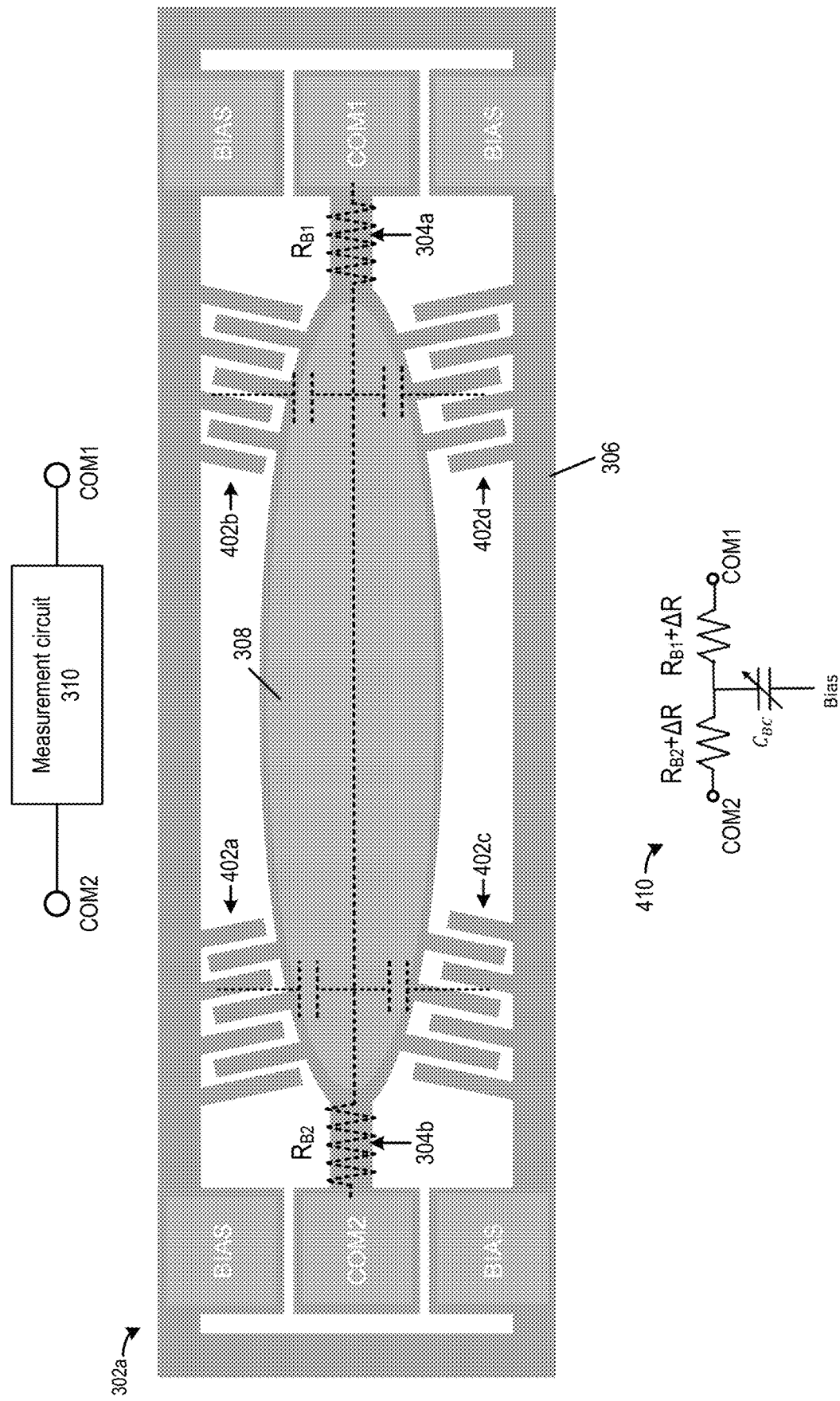
FIG. 4A, FIG. 4B, FIG. 4C, FIG. 4D, and FIG. 4E illustrate examples of internal components of the light steering system of FIG. 3A-FIG. 3C and their operations, according to examples of the present disclosure.
Figure 5A:
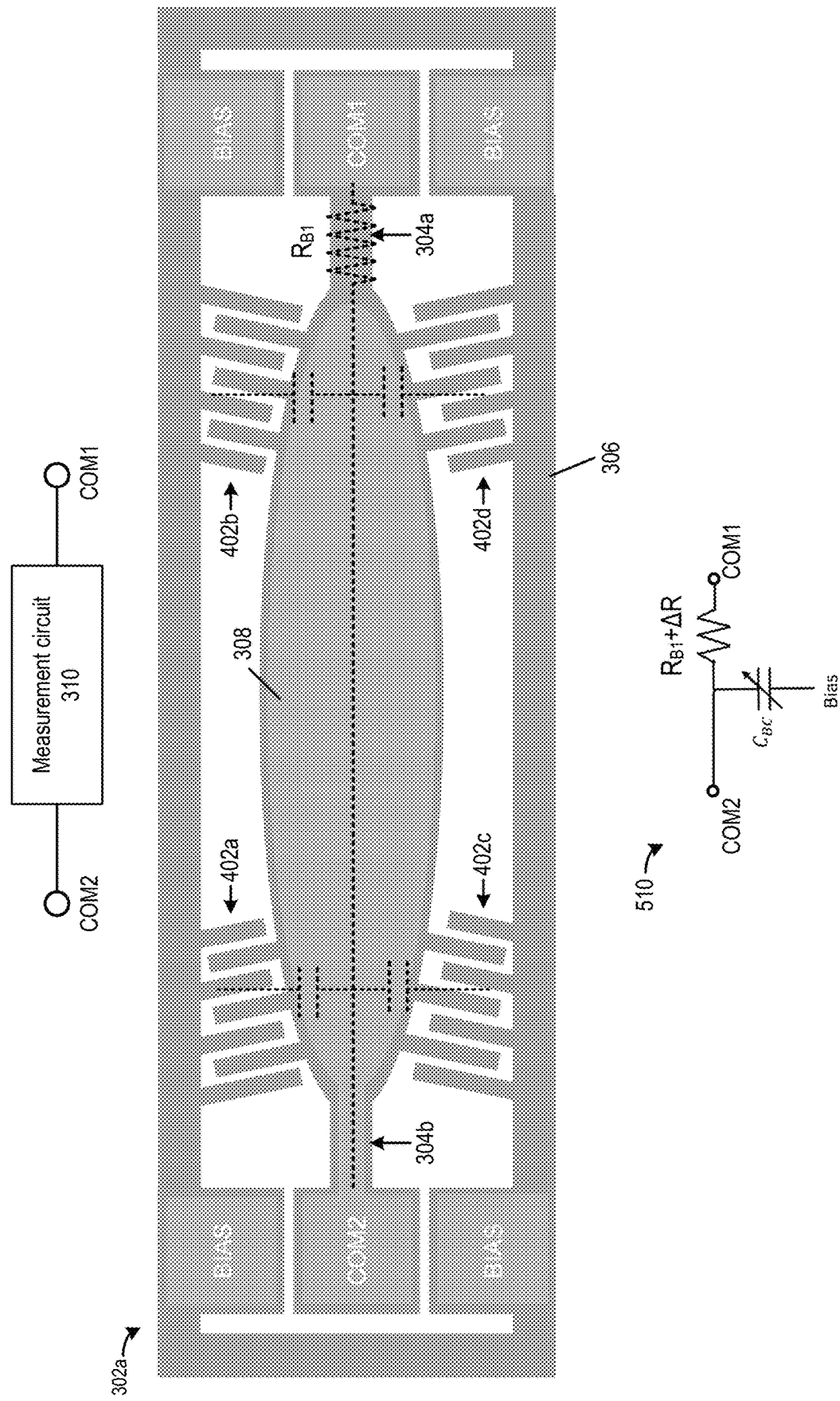
FIG. 5A and FIG. 5B illustrate other examples of internal components of the light steering system of FIG. 3A-FIG. 3C, according to examples of the present disclosure.

In some examples, as shown in FIG. 4A, the substrate can include a pair of substrate electrical contacts. The measurement circuit can be electrically connected to the substrate electrical contacts on the substrate to measure the electrical resistance. Such arrangements can avoid forming probes on the connection structure, which can reduce the complexity of the connection structure and simplify the fabrication process of the micro-mirror assembly. In some examples, the measurement circuit can measure the electrical resistance of a conductive path that traverses the first connection structure, the micro-mirror, and the second connection structure. As the micro-mirror is typically coated with a metal layer (e.g., silver) to improve reflectivity, which also reduces the resistance of the micro-mirror, the electrical resistance of the conductive path is typically dominated by the first and second connection structures. As such, the measurement circuit can measure the total electrical resistance of the first and second connection structures, which reflects the actual rotation angle of the micro-mirror. In some examples, as shown in FIG. 5A, one of the connection structures (e.g., first connection structure) can also be coated with the metal layer to reduce its electrical resistance. In such a case, the electrical resistance of the conductive path is dominated by the connection structure not coated with the metal layer (e.g., the second connection structure), and the measurement circuit can measure the electrical resistance of that connection structure. Such arrangements can reduce a noise signal introduced by crosstalk from the control signal (e.g., the first signal, the second signal, etc.) in a case where the actuator rotates the micro-mirror by an electrostatic force and can couple the control signal into the micro-mirror as crosstalk.

Figure 4B:
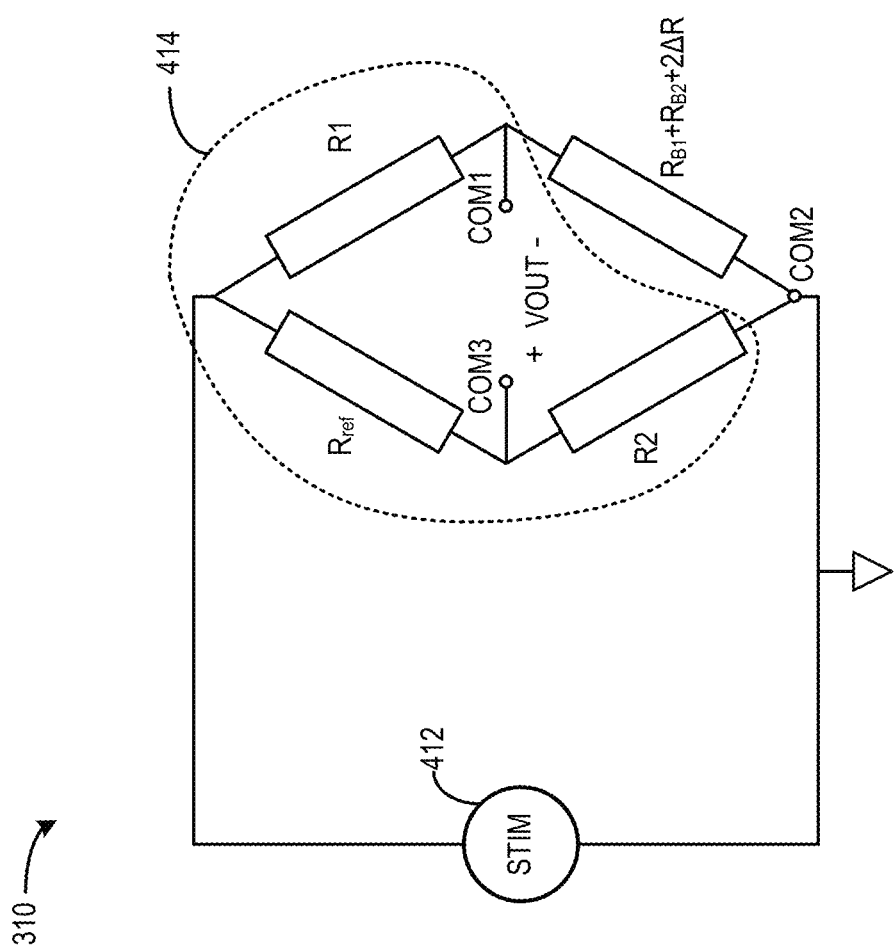

In some examples, as shown in FIG. 4B, the measurement circuit can include a bridge circuit, a stimulus generator, and an amplifier circuit. The bridge circuit can include a network of resistors that is electrically connected across the two substrate electrical contacts. The network of resistors can include a reference resistor. To measure the electrical resistance of the conductive path across the micro-mirror, the stimulus generator can supply a first voltage signal to the bridge circuit. The bridge circuit can generate a second voltage signal, which reflects a relationship between the electrical resistance of the reference resistor and the electrical resistance of the conductive path of the micro-mirror being measured. The amplifier circuit can amplify the second voltage signal, which can then be quantized into an input digital value. In some examples, the controller can maintain a mapping table that maps digital values obtained from the measurement circuit to different rotation angles. The controller can then determine the actual rotation angle mapped to the input digital value from the mapping table and adjust the control signal based on a difference between the actual rotation angle and the target rotation angle. In some examples, to reduce power, the first voltage signal can be in the form of a pulse-width modulation (PWM) signal having periodic on times and off times, and the electrical resistance measurement can be performed during the on times of the PWM signals.

With the disclosed examples, the controller can implement a feedback loop in which the controller can transmit a control signal to an actuator to rotate a micro-mirror by a target rotation angle, obtain a measurement of the actual rotation angle of the micro-mirror in response to the control signal, determine a difference (if any) between the actual rotation angle and the target rotation angle which represents an error angle, and adjust the control signal to reduce the error angle. By adapting the control signal to reduce or even eliminate the error angle, the control precision of the micro-mirror can be improved. In addition, the controller can implement the feedback loop for each micro-mirror (or subsets of the micro-mirrors) of the micro-mirror array to improve the uniformity of rotation among the micro-mirrors, which can reduce the dispersion of the reflected light and improve the imaging/ranging resolution. All of these can improve the robustness and performance of a light steering system.

Typical System Environment for Certain Examples

FIG. 1 illustrates an autonomous vehicle 100 in which the disclosed techniques can be implemented. Autonomous vehicle 100 includes a LiDAR module 102. LiDAR module 102 allows autonomous vehicle 100 to perform object detection and ranging in a surrounding environment. Based on the result of object detection and ranging, autonomous vehicle 100 can maneuver to avoid a collision with the object. LiDAR module 102 can include a light steering transmitter 104 and a receiver 106. Light steering transmitter 104 can project one or more light signals 108 at various directions at different times in any suitable scanning pattern, while receiver 106 can monitor for a light signal 110 which is generated by the reflection of light signal 108 by an object. Light signals 108 and 110 may include, for example, a light pulse, a frequency modulated continuous wave (FMCW) signal, or an amplitude modulated continuous wave (AMCW) signal. LiDAR module 102 can detect the object based on the reception of light pulse 110 and can perform a ranging determination (e.g., a distance of the object) based on a time difference between light signals 108 and 110. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can adjust its speed (e.g., by slowing or stopping) to avoid collision with object 112 based on the detection and ranging of object 112 by LiDAR module 102.

FIGS. 2A-2E illustrate examples of internal components of a LiDAR module 102. LiDAR module 102 includes a transmitter 202, a receiver 204, and a LiDAR controller 206 which controls the operations of transmitter 202 and receiver 204. Transmitter 202 includes a light source 208 and a collimator lens 210, whereas receiver 204 includes a lens 214 and a photodetector 216. LiDAR module 102 further includes a mirror assembly 212 and a beam splitter 213. In LiDAR module 102, transmitter 202 and receiver 204 can be configured as a coaxial system to share mirror assembly 212 to perform light steering operation, with beam splitter 213 configured to reflect incident light reflected by mirror assembly 212 to receiver 204.

FIG. 2A illustrates a light projection operation. To project light, LiDAR controller 206 can control light source 208 (e.g., a pulsed laser diode, a source of FMCW signal, AMCW signal) to transmit light signal 108 as part of light beam 218. Light beam 218 can disperse upon leaving light source 208 and can be converted into collimated light beam 218 by collimator lens 210. Collimated light beam 218 can be incident upon a mirror assembly 212, which can reflect collimated light beam 218 to steer it along an output projection path 219 towards object 112. Mirror assembly 212 can include one or more rotatable mirrors. FIG. 2A illustrates mirror assembly 212 as having one mirror, but as to be described below, a micro-mirror array comprising multiple micro-mirror assemblies can be used to provide the steering capability of mirror assembly 212. Mirror assembly 212 further includes one or more actuators (not shown in FIG. 2A) to rotate the rotatable mirrors. The actuators can rotate the rotatable mirrors around a first axis 222 and can rotate the rotatable mirrors along a second axis 226. The rotation around first axis 222 can change a first angle 224 of output projection path 219 with respect to a first dimension (e.g., the x-axis), whereas the rotation around second axis 226 can change a second angle 228 of output projection path 219 with respect to a second dimension (e.g., the z-axis). LiDAR controller 206 can control the actuators to produce different combinations of angles of rotation around first axis 222 and second axis 226 such that the movement of output projection path 219 can follow a scanning pattern 232. A range 234 of movement of output projection path 219 along the x-axis, as well as a range 238 of movement of output projection path 219 along the z-axis, can define an FOV. An object within the FOV, such as object 112, can receive and reflect collimated light beam 218 to form reflected light signal, which can be received by receiver 204.

FIG. 2B illustrates a light detection operation. LiDAR controller 206 can select an incident light direction 239 for detection of incident light by receiver 204. The selection can be based on setting the angles of rotation of the rotatable mirrors of mirror assembly 212, such that only light beam 220 propagating along light direction 239 gets reflected to beam splitter 213, which can then divert light beam 220 to photodetector 216 via collimator lens 214. With such arrangements, receiver 204 can selectively receive signals that are relevant for the ranging/imaging of object 112, such as light signal 110 generated by the reflection of collimated light beam 218 by object 112, and not to receive other signals. As a result, the effect of environment disturbance on the ranging/imaging of the object can be reduced and the system performance can be improved.

Figure 2C:
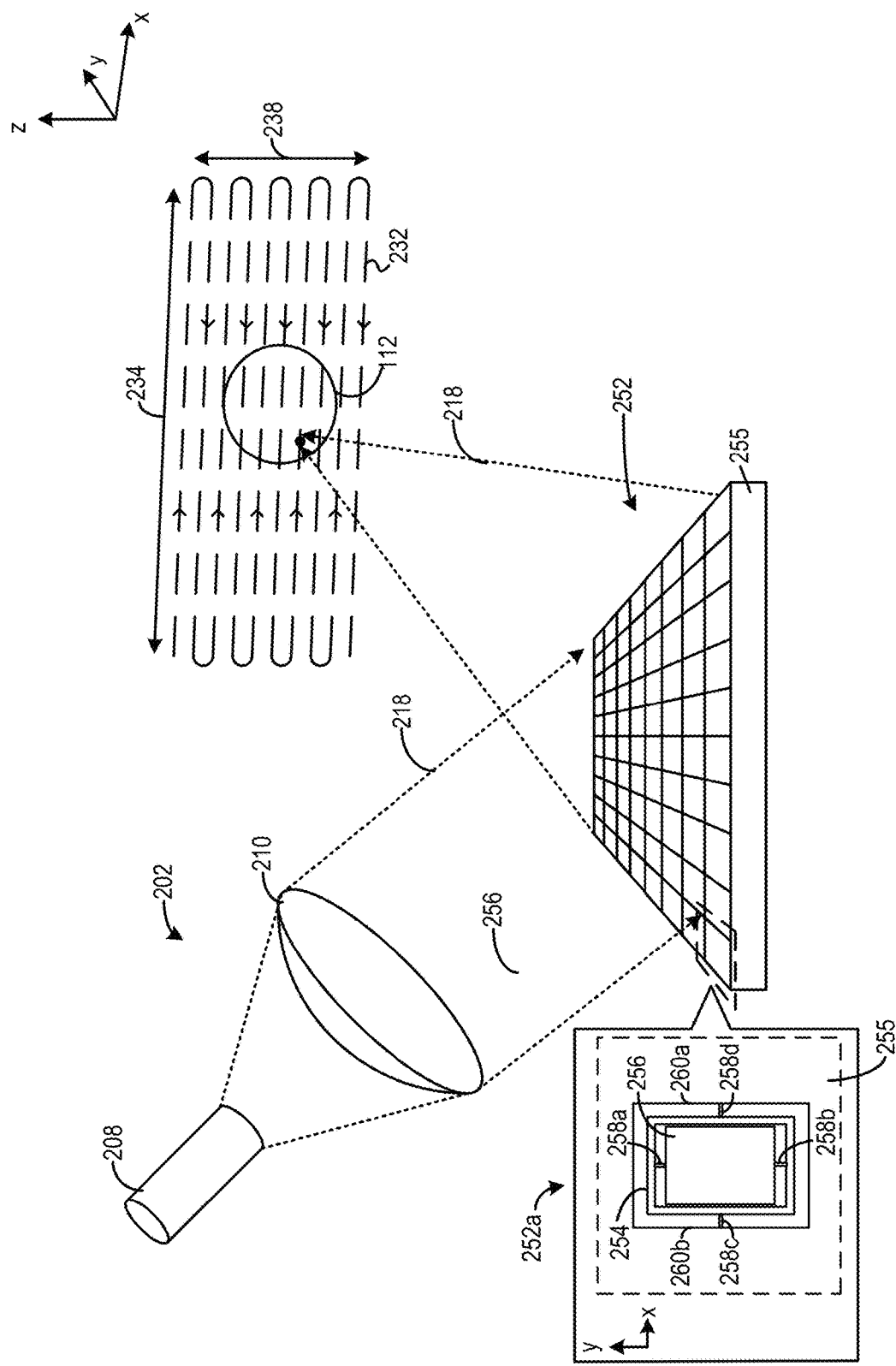

FIG. 2C illustrates an example of a micro-mirror array 250 that can be part of light steering transmitter 202 and can provide the steering capability of mirror assembly 212. Micro-mirror array 250 can include an array of micro-mirror assemblies 252, including micro-mirror assembly 252a. FIG. 2D illustrates an example of micro-mirror assembly 252a. The array of micro-mirror assemblies 252 can include an MEMS implemented on a semiconductor substrate 255. Each of micro-mirror assemblies 252 may include a frame 254 and a micro-mirror 256 forming a gimbal structure. Specifically, connection structures 258a and 258b connect micro-mirror 256 to frame 254, whereas connection structures 258c and 258d connect frame 254 (and micro-mirror 256) to side walls 260a and 260b of semiconductor substrate 255. A pair of connection structures can define a pivot/axis of rotation for micro-mirror 256. For example, connection structures 258a and 258b can define a pivot/axis of rotation of micro-mirror 256 about the y-axis within frame 254, whereas connection structures 258c and 258d can define a pivot/axis of rotation of frame 254 and micro-mirror 256 about the x-axis with respect to semiconductor substrate 255.

Each of micro-mirror assemblies 252 can receive and reflect part of light beam 218. The micro-mirror 256 of each of micro-mirror assemblies 252 can be rotated by an actuator of the micro-mirror assembly (not shown in FIG. 2C) at a first angle about the y-axis (around connection structures 258a and 258b) and at a second angle about the x-axis (around connection structures 258c and 258d) to set the direction of output projection path for light beam 218 and to define the FOV, as in FIG. 2A, or to select the direction of input light to be detected by receiver 204, as in FIG. 2B.

To accommodate the rotation motion of mirror 256, connection structures 258a, 258b, 258c, and 258d are configured to be elastic and deformable. The connection structure can be in the form of, for example, a torsion bar or a spring and can have a certain spring stiffness. The spring stiffness of the connection structure can define a torque required to rotate mirror 256 by a certain rotation angle, as follows:

$$\tau = -K\theta \qquad \text{(Equation 1)}$$

In Equation 1, $\tau$ represents torque and $K$ represents a spring constant that measures the spring stiffness of the connection structure, whereas $\theta$ represents a target rotation angle. The spring constant can depend on various factors, such as the material of the connection structure or the cross-sectional area of the connection structure. For example, the spring constant can be defined according to the following equation:

$$K = \frac{k_2 \times G \times w^3 \times t}{L} \qquad \text{(Equation 2)}$$

In Equation 2, L is the length of the connection structure, G is the shear modulus of material that forms the connection structure, and $k_2$ is a factor that depends on the ratio between thickness (t) and width (w) given as t/w. The larger the ratio t/w, the more $k_2$ is like a constant. The table below provides illustrative examples of $k_2$ for different ratios of t/w:

| Ratio of t/w | $k_2$ |
|---|---|
| 1 | 0.141 |
| 2 | 0.229 |
| 3 | 0.263 |
| 6 | 0.298 |
| ∞ | 0.333 |

In a case where w is one-third of t or less, $k_2$ becomes almost like a constant, and spring constant K can be directly proportional to thickness.

Figure 2E:
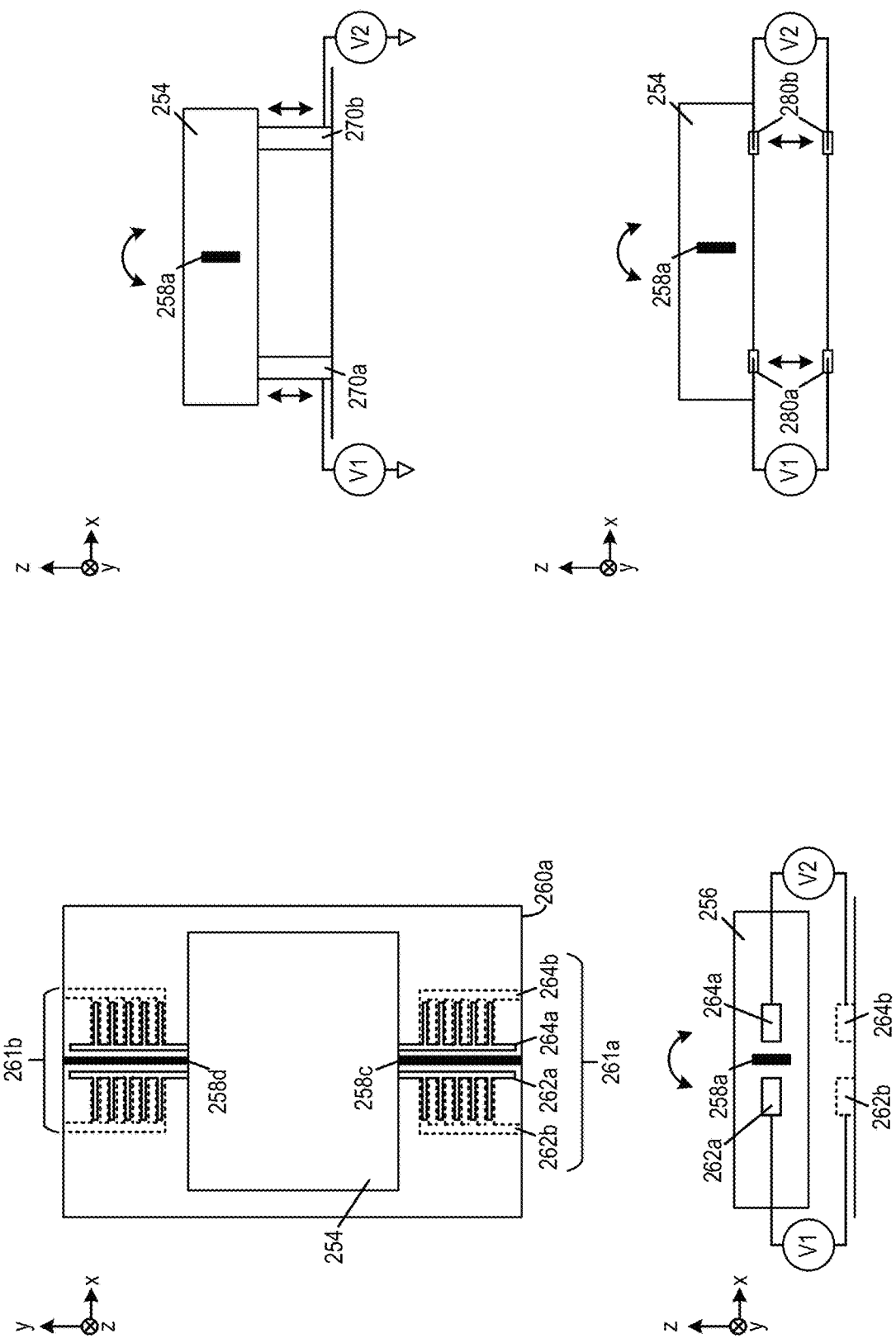

Various types of actuators can be included in micro-mirror assemblies 252 to provide the torque, such as an electrostatic actuator, an electromagnetic actuator, or a piezoelectric actuator. FIG. 2E illustrates examples of actuators that can be included in micro-mirror assemblies 252 to provide the torque. As shown in FIG. 2E, a pair of comb drives 261a and 261b can be positioned around, respectively, connection structures 258c and 258d. Each of comb drives 261a and 261b can include two pairs of electrodes, such as electrodes 262a and 262b and electrodes 264a and 264b for comb drive 261a. Electrodes 262a and 264a can be connected to micro-mirror 256, whereas electrodes 262b and 264b can be connected to sidewall 260a. When a voltage V1 is applied across electrodes 262a and 262b, opposite charges can accumulate, and an electrostatic force F1, defined according to the following equation, can be developed between electrodes 262a and 262b due to the accumulation of charges. Electrostatic force F1 can apply a torque and cause micro-mirror 256 to rotate in a clockwise direction.

$$F1 = -P(V1)^2 \qquad \text{(Equation 3)}$$

In Equation 3, P is a constant based on permittivity, a number of fingers of the electrodes, gap between the electrodes, etc. As shown in Equation 3, the electrostatic force (and the resulting net torque) can be directly proportional to a square of applied voltage.

Moreover, when a voltage V2 is applied across electrodes 264a and 264b, an electrostatic force F2 can develop according to Equation 2. Electrostatic force F2 can also apply a torque and cause micro-mirror 256 to rotate in a counter-clockwise direction.

In some examples, a pair of piezoelectric actuators 270a and 270b, or a pair of electromagnetic devices 280a and 280b, can also be positioned on two sides of a connection structure (e.g., connection structure 258c). Each of the piezoelectric actuators 270a and 270b can expand or contract based a voltage (e.g., V1 and V2) applied to the actuators and can create a torque to push micro-mirror 256 to rotate clockwise or counterclockwise around connection structure 258a. Moreover, each pair of electromagnetic actuators 280a and 280b can also generate an electromagnetic force based on a voltage (e.g., V1 and V2) applied to the actuators. The electromagnetic force between each pair of electromagnetic actuators 280a and 280b can also create a torque to rotate micro-mirror 256 clockwise or counterclockwise around connection structure 258a. For both piezoelectric actuators 270a and 270b and electromagnetic actuators 280a and 280b, the net torque can be directly proportional to the applied voltage, according to the following equation:

$$F1 = -Q(V1) \qquad \text{(Equation 4)}$$

In Equation 4, F1 can be the force provided by an actuator (e.g., piezoelectric actuator 270, electromagnetic actuator 280a), whereas V1 is the voltage applied to the actuator. Q can be a constant based on various physical properties of the actuator.

To rotate micro-mirror 256, a controller can set the voltages V1 and V2 to set a torque applied to micro-mirror 256 for each of comb drives 261a and 261b, piezoelectric actuators 270a and 270b, and electromagnetic devices 280a and 280 based on Equations 2 and 3.

In some examples, a mapping table can be generated based on Equations 1-4 to provide a mapping between a target rotation angle θ and the control signal (e.g., a voltage) supplied to the actuator. A controller can then refer to the mapping table to generate a control signal based on the target rotation angle and supply the control signal to control the rotation of micro-mirror 256 to rotate by the target rotation angle. In addition, the controller can supply the control signal at a frequency close to the natural frequency of micro-mirror 256 to induce harmonic resonance, which can substantially reduce the torque required to rotate the micro-mirror by the target rotation angle.

The performance of the light steering system, however, can be degraded by the limited control precision. Specifically, the controller can refer to the mapping table to generate a control signal for a given target rotation angle, but due to limited control precision, the actuator may be unable to rotate the mirror exactly by that target rotation angle. As a result, the mirror may be unable to rotate over a desired range of angle, which can reduce the achievable FOV. Moreover, due to the limited control precision, the rotation angles of each micro-mirror in the array also vary. The non-uniformity in the rotation angles of the micro-mirrors can increase the dispersion of the reflected light and reduce the imaging/ranging resolution.

The control precision limitation can come from various sources. One example source of control precision limitation comes from variations in the fabrication process. As described above, the torque required to rotate micro-mirror 256 by a target rotation angle depends on the spring constant of the connection structure. Due to variations in the fabrication process, the dimensions of the connection structure may become different from the designed values, which introduces variations in the spring constant of the connection structure. As a result, the torque required to rotate the micro-mirror by the target rotation angle may also be different from the value listed in the mapping table. As another example, the actuator may not create the target torque in response to the control signal due to various non-idealities. For example, due to electrical resistance of the transmission paths of the control signal, the amplitude of the control signal can be reduced when it arrives at the actuator. In all these cases, the actual rotation angle of the micro-mirror may not match the target rotation angle, which leads to degradation in the control precision of the micro-mirror.

Examples of Adaptive Control Signal Generation

FIG. 3A illustrates an example of a light steering system 300 that can address at least some of the issues described above. As shown in FIG. 3A, the light steering system comprises an actuator controller 301 and an array of micro-mirror assemblies 302, which can be formed on a semiconductor substrate to form an integrated circuit. Each of array of micro-mirror assemblies 302, such as micro-mirror assembly 302a, includes connection structures 304, actuators 306, a micro-mirror 308, and a measurement circuit 310. In some examples, measurement circuit 310 can be external to micro-mirror assembly 302a. Connection structures 304 can be similar to those shown in FIG. 2A-FIG. 2E and can be in the form of a spring, a torsion bar, etc. Actuators 306 can include various types of actuators, such as an electrostatic actuator, an electromagnetic actuator, and a piezoelectric actuator as shown in FIG. 2E. Measurement circuit 310 can measure an actual rotation angle of micro-mirror 308 when the micro-mirror is rotated by actuators 306.

In addition, actuator controller 301 includes a control signal generation module 320. Control signal generation module 320 can receive target rotation angle information 340 (e.g., from LiDAR controller 206) to generate a control signal 342. The control signal can be in the form of a voltage to be applied to the actuator. The magnitude/frequency of control signal 342 can be determined based on a torque required to achieve the target rotation angle, and a property of the actuator that determines a relationship between the voltage and the torque, as described above in Equations 1-4. For example, control signal generation module 320 can maintain a mapping table 344 that maps different target rotation angles to different magnitudes/frequencies of control signal 342. From the mapping table, control signal generation module 320 can retrieve the magnitude/frequency of a control signal for target rotation angle 340 and generate control signal 342 according to the retrieved magnitude/frequency. Actuator controller 301 can then transmit control signal 342 to actuators 306 to rotate micro-mirror 308 by target rotation angle 340.

Referring back to micro-mirror assembly 302a, upon receiving control signal 342, actuators 306 can rotate micro-mirror 308 by an actual rotation angle 346. Actual rotation angle 346 may or may not be the same as target rotation angle 340 due to variations in the fabrication process of micro-mirror assembly 302, various non-idealities, etc., such that the actual relationship between the rotation angle and control signal is different from the mapping in mapping table 344. The difference between target rotation angle 340 and actual rotation angle 346 can represent a rotation angle error.

To reduce the rotation angle error, control signal adjustment module 350 can obtain actual rotation angle 346 and determine a relationship between actual rotation angle 346 and target rotation angle 340. Control signal adjustment module 350 can then adjust control signal 342 to generate control signal 352 based on the relationship. For example, control signal adjustment module 350 can generate control signal 352 based on adjusting the magnitude of control signal 342 as follows:

$$\text{Signal}_{352} = \frac{\text{Target rotation angle}}{\text{Actual rotation angle}} \times \text{Signal}_{342} \quad \text{(Equation 5)}$$

In some examples, control signal generation module 320 can also generate control signal 352 based on a slow feedback mechanism, in which control signal generation module 320 increases or decreases the amplitude of control signal 342 in predetermined steps, and obtain the updated actual rotation angle from measurement circuit 310 for each step, until the rotation angle error settles to within an error threshold.

In some examples, control signal generation module 320 can generate control signal 342 having a particular frequency. The periodic rotation of micro-mirror 308 can be performed according to scanning pattern as shown in FIG. 2C to rotate micro-mirror 308 across a range of angles to achieve a two-dimensional FOV. Control signal 342 can be configured to inject energy into actuators 406 at a frequency close to a presumed natural frequency of micro-mirror 308 to induce harmonic resonance, which allows substantial reduction in the required torque to achieve a range of rotation for the target FOV. But the actual range of rotation angle may become smaller than the target range of rotation angle if the frequency of control signal 342 does not match the actual natural frequency of micro-mirror 308, due to the actual natural frequency of the micro-mirror being different from the presumed natural frequency. In such a case, adjustment module 350 can obtain measurements from measurement circuit 310 to determine the range of rotation angles of micro-mirror 308 in response to control signal 342. Adjustment module 350 can then generate control signal 352 based on increasing or decreasing the frequency of control signal 342. The frequency of the control signal can be adjusted in steps until the actual range of rotation angles matches (to within an error threshold) a target range of rotation angles, which can indicate that the micro-mirror is being rotated at its natural frequency and harmonic resonance is achieved.

Figure 3C:
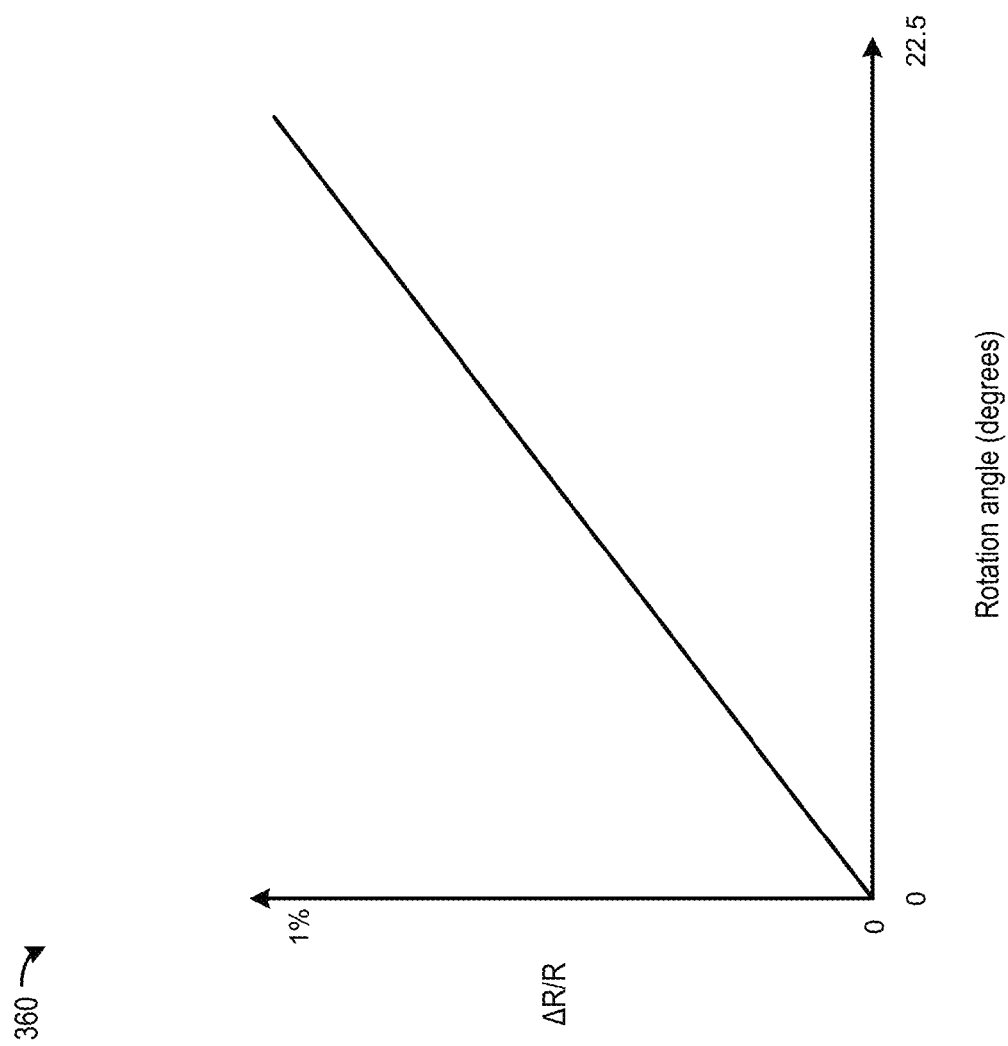

FIG. 3B and FIG. 3C illustrate examples of techniques employed by measurement circuit 310 to measure the actual rotation angle of micro-mirror 308. Referring to FIG. 3B, as micro-mirror 308 of micro-mirror assembly 312 rotates, connection structures 304a and 304b deform to accommodate the rotation. Moreover, micro-mirror 308 also pulls connection structures 304a and 304b away from, respectively, connection points 305a and 305b, at which the connection structures are connected to the substrate. The pulling force can create a normal stress (σ) on connection structures 304a and 304b, whereas the deformation can create a shear force (τ) on the connection structures.

The different stresses can change the electrical resistance of connection structures 304, for example, referring to the bottom diagram of FIG. 3B, an electrical resistance R of connection structure 304a measured between connection point 305a (at substrate) and connection point 307a (at micro-mirror 308). A change in electrical resistance ΔR can be related to the resistivity ρ and permittivity E of connection structure 304a (e.g., silicon) as follows:

$$\frac{\Delta R}{R} = (1 + 2)\varepsilon + \frac{\Delta \rho}{\rho} \quad \text{(Equation 6)}$$

The resistivity ρ can depend on the electrical current, stress, and crystallographic orientation of the silicon material of connection structure 304a. A general matrix representation for a family of directions of a silicon single crystal can be expressed as:

$$\frac{1}{\rho_0}\begin{bmatrix}\Delta\rho_{11}\\\Delta\rho_{22}\\\Delta\rho_{33}\\\Delta\rho_{23}\\\Delta\rho_{13}\\\Delta\rho_{12}\end{bmatrix}=\begin{bmatrix}\pi_{11}&\pi_{12}&\pi_{12}&0&0&0\\\pi_{12}&\pi_{22}&\pi_{12}&0&0&0\\\pi_{12}&\pi_{12}&\pi_{33}&0&0&0\\0&0&0&\pi_{44}&0&0\\0&0&0&0&\pi_{44}&0\\0&0&0&0&0&\pi_{44}\end{bmatrix}\begin{bmatrix}\sigma_{xx}\\\sigma_{yy}\\\sigma_{zz}\\\tau_{yz}\\\tau_{xz}\\\tau_{xy}\end{bmatrix}$$ (Equation 7)

In Equation 7, $\sigma_{xx}$, $\sigma_{yy}$, and $\sigma_{zz}$ refer to normal stresses along the x, y and z axes, whereas the $\tau_{xx}$, $\tau_{yy}$, and $\tau_{zz}$ refer to shear stresses between the y-z axes, x-z axes, and x-y axes. The parameters $\Delta\rho_{11}$, $\Delta\rho_{22}$, $\Delta\rho_{33}$, $\Delta\rho_{23}$, $\Delta\rho_{13}$, and $\Delta\rho_{12}$ refer to changes in resistivity along different crystallographic orientations. The parameter $\rho_0$ can refer to the original resistivity of silicon without the effect of stress. A matrix of $\pi$ parameters can transform a matrix of normal and shear stresses to a matrix of resistivity changes.

As described above, the normal and shear stresses are introduced by the deformation of connection structure 304a to accommodate the rotation of micro-mirror 308. At different rotation angles, there can be different distributions of normal and shear stresses. Therefore, the resistance R of connection structure 304a can also change with the rotation angle. As shown in chart 360 of FIG. 3C, the ratio between a change in resistance ΔR and resistance R of connection structure 304a can have a linear relationship with the rotation angle of micro-mirror 308. From chart 360, based on measuring the resistance R, the actual rotation angle of micro-mirror 308 can be determined. In the example of FIG. 3C, the range of ΔR/R can vary from 0 to 1%, whereas the rotation angle can vary from 0 to 22.5 degrees. It is understood that the ranges in FIG. 3C are provided only as an example.

FIG. 4A-FIG. 4E illustrate an example arrangement of measuring the electrical resistance of the connection structures of a micro-mirror. FIG. 4A illustrates an example of micro-mirror assembly 302a of FIG. 3A. As shown in FIG. 4A, micro-mirror assembly 302a includes micro-mirror 308 and connection structures 304a and 304b. Each of connection structures 304a and 304b is connected to an electrical contact formed on the substrate, labeled "COM1" and "COM2," and can have an original resistance (resistance without deformation) of, respectively, $R_{B1}$ and $R_{B2}$. Measurement circuit 310 can be electrically connected to the electrical contacts COM1 and COM2 to measure the electrical resistance of a conductive path comprising connection structure 304a, micro-mirror 308, and connection structure 304b. Moreover, actuators 306 can be in the form of a comb drive which includes pairs of finger structures 402a, 402b, 402c, and 402d formed on micro-mirror 308 and on the substrate. Actuators 306 include electrical contacts labeled "BIAS" formed on the substrate. The BIAS electrical contacts can receive a sinusoidal voltage signal to induce electrostatic force between the pairs of finger structures to rotate micro-mirror 308. The electrical resistance between the COM1 and COM2 electrical contacts can be represented by a simplified model 410, which also includes a capacitor $C_{BC}$ that models a coupling capacitance between the pairs of fingers of actuators 306.

In FIG. 4A, the electrical contacts COM1, COM2, and BIAS, as well as the light reflection surface of micro-mirror 308, can be coated with a layer of metal (e.g., silver). The metal layer can reduce the resistance of the electrical contacts and increase the light reflectivity of micro-mirror 308. Due to the metallic coating of micro-mirror 308 as well as its width, the electrical resistance of micro-mirror 308 is negligible compared with those of connection structures 304a and 304b. Therefore, as shown in model 410, the electrical resistance between the COM1 and COM2 electrical contacts can be represented by the total original resistances of connection structures 304a and 304b $R_{B1}+R_{B2}$, as well as change in the resistance 2ΔR as micro-mirror 308 rotates.

FIG. 4B illustrates an example of some of the internal components of measurement circuit 310. As shown in FIG. 4B, measurement circuit 310 can include a stimulus generator 412 and a network of resistors 414 comprising resistors R1, R2, and $R_{ref}$. Resistor $R_{ref}$ can be a reference resistor to compare with the electrical resistances $R_{B1}+R_{B2}+2\Delta R$ of the connection structures and can have a resistance similar to $R_{B1}+R_{B2}$. The resistors R1 and R2 can be chosen to be equal to or larger than $R_{ref}$ and $R_{B1}+R_{B2}$ (e.g., 20% larger). Network of resistors 414 can be connected to electrical contacts COM1 and COM2, and with connection structures 304 (represented by a resistor labeled "$R_{B1}+R_{B2}+2\Delta R$") to form a bridge structure. The COM2 electrical contact can also be connected to ground. Stimulus generator 412 can supply a voltage across the bridge structure, which causes current to flow through a first branch comprising resistors R2 and $R_{ref}$, and through a second branch comprising resistors R1 and $R_{B1}+R_{B2}+2\Delta R$. An output voltage VOUT can be generated between electrical contacts COM1 and COM3 (not shown in FIG. 4A). The output voltage VOUT can represent a relationship between electrical resistances $R_{B1}+R_{B2}+2\Delta R$ and $R_{ref}$. With the bridge structure, a differential output voltage VOUT can be obtained to eliminate DC offset. In some examples, resistors R2 and $R_{ref}$ can be omitted, and electrical resistances $R_{B1}+R_{B2}+2\Delta R$ and R1 can form a voltage divider structure. In such examples, output voltage VOUT can be measured at the COM1 electrical contact to represent a relationship between electrical resistances $R_{B1}+R_{B2}+2\Delta R$ and R1. In both cases, by measuring VOUT, the total resistance of connection structures 304a and 304b, and the rotation angle of micro-mirror 308, can be determined.

In some examples, stimulus generator 412 can output a PWM signal having periodic on times and off times to network of resistors 414. Measurement of actual rotation angle can be performed during the on times, and no measurement is made during the off times. Compared with a case where stimulus generator 412 supplies a DC voltage signal to network of resistors 414, having stimulus generator 412 to output a PWM signal and performing rotation angle measurements only at certain times can reduce the power consumption of measurement circuit 310.

Figure 4C:
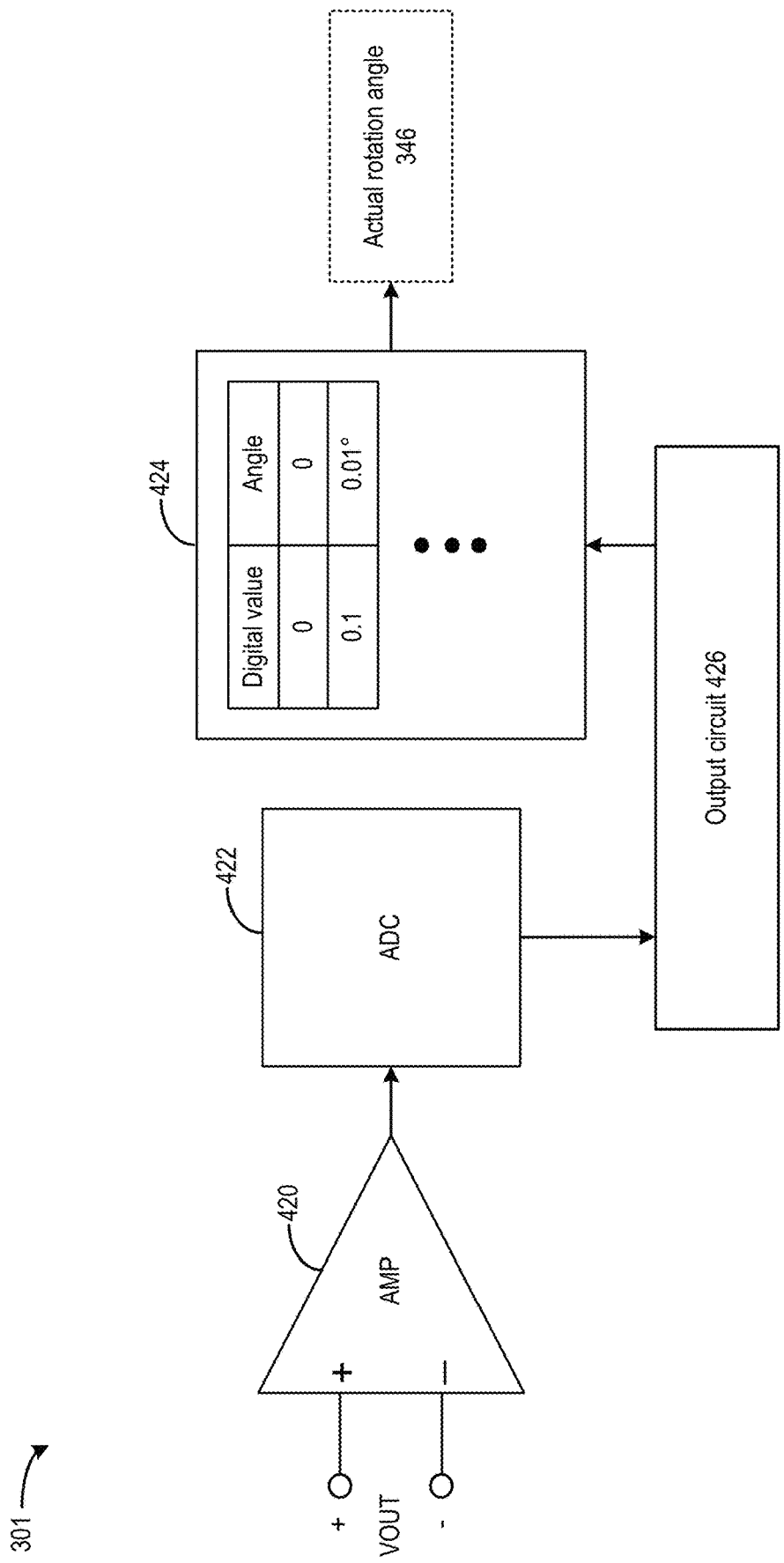

In some examples, referring to FIG. 4C, actuator controller 301 further includes an amplifier 420, an analog-to-digital converter (ADC) 422, a mapping table 424, and output circuit 426. Amplifier 420 can receive the VOUT output voltage from network of resistors 414 and amplify the output voltage. ADC 422 can quantize the amplified output voltage to a digital value and provide the digital value to output circuit 426. Mapping table 424 can maintain a mapping between digital values and rotation angles. With an input digital value from ADC 422, output circuit 426 can access mapping table 424 to retrieve the rotation angle mapped to the input digital value and output the rotation angle as actual rotation angle 346.

Figure 4D:
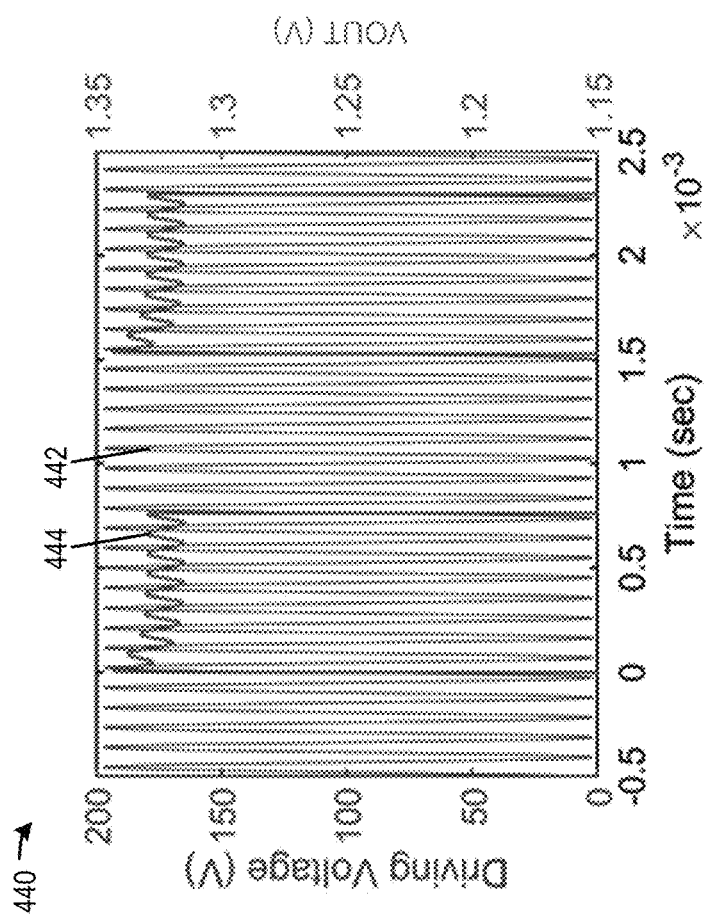
Figure 4D:
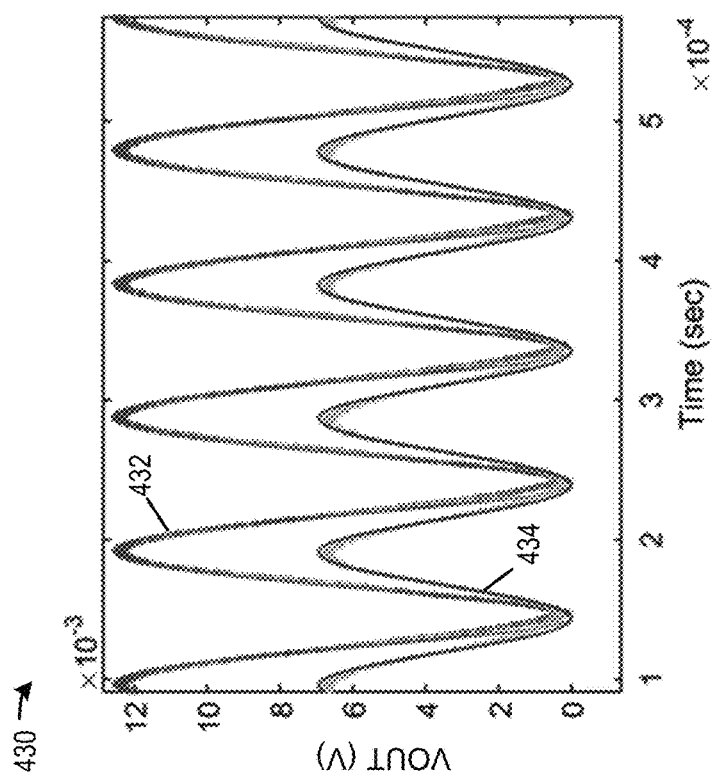
Figure 4E:
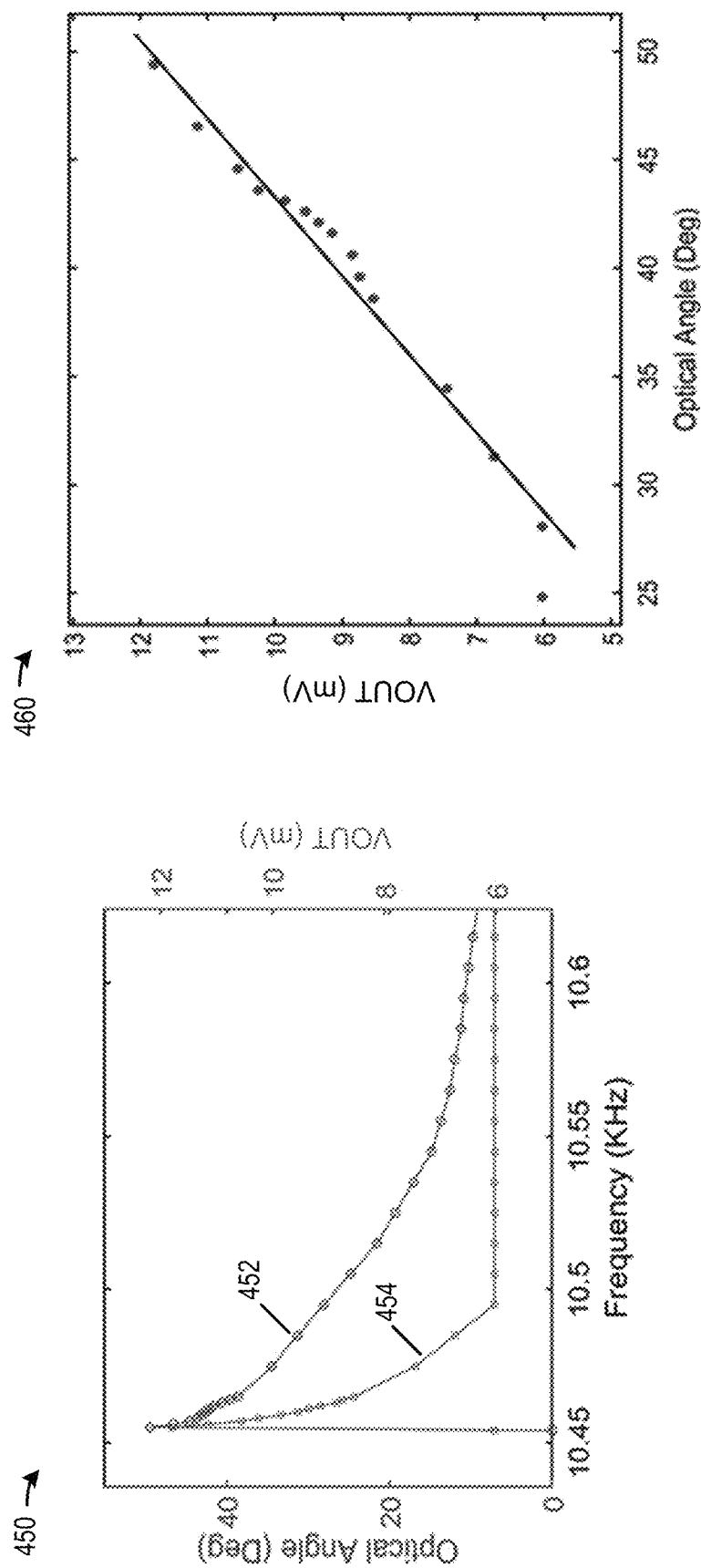

FIG. 4D and FIG. 4E illustrate examples of outputs of measurement circuit 310. FIG. 4E includes charts 430 and 440. Chart 430 includes graph 432 and 434. Graph 432 and 434 illustrate the output voltage (VOUT) between electrical contacts COM1 and COM3 of FIG. 4B when actuators 306 receive a sinusoidal driving voltage signal via the BIAS electrical contacts, which causes micro-mirror 308 to rotate according to a sinusoidal pattern. The frequency of the sinusoidal driving voltage signal, as well as the frequency of rotation of micro-mirror 308, is at about 10 KHz. Graph 432 corresponds to a case where micro-mirror 308 rotates at an angle of 50°, whereas graph 434 corresponds to a case where micro-mirror 308 is static. The sinusoidal VOUT where micro-mirror 308 is static can be attributed to capacitive coupling of the sinusoidal driving voltage signal from the BIAS electrical contacts via capacitor $C_{BC}$ (representing pairs of fingers 402a-402d) and can represent noise signals.

In addition, chart 440 illustrates the outputs of measurement circuit 310 where stimulus generator 412 outputs a PWM signal. Chart 440 includes graphs 442 and 444. Graph 442 illustrates the sinusoidal driving voltage signal at the BIAS electrical contacts, whereas graph 444 illustrates VOUT. As shown in chart 440, VOUT tracks the rotation angle of micro-mirror 308 and has a sinusoidal pattern during the on times of the PWM, in the durations between 0 and 0.75 seconds and between 1.5 and 2.25 seconds.

FIG. 4E illustrates additional examples of outputs of measurement circuit 310. FIG. 4E includes charts 450 and 460. Chart 450 includes graphs 452 and 454. Graph 452 illustrates the actual rotation angles of micro-mirror 308 at different frequencies, whereas graph 454 illustrates the corresponding VOUT output by measurement circuit 310. As shown in chart 450, VOUT is largely linear with respect to the rotation angle of micro-mirror 308 when micro-mirror 308 rotates at a resonant frequency between 10.45 KHz and 10.5 KHz. Chart 460 illustrates a plot of the different VOUTs and the corresponding rotation angles of chart 450 when micro-mirror 308 rotates within a frequency range of 10.45 KHz and 10.5 KHz, which shows the linear relationship between VOUT and rotation angle.

Figure 5B:
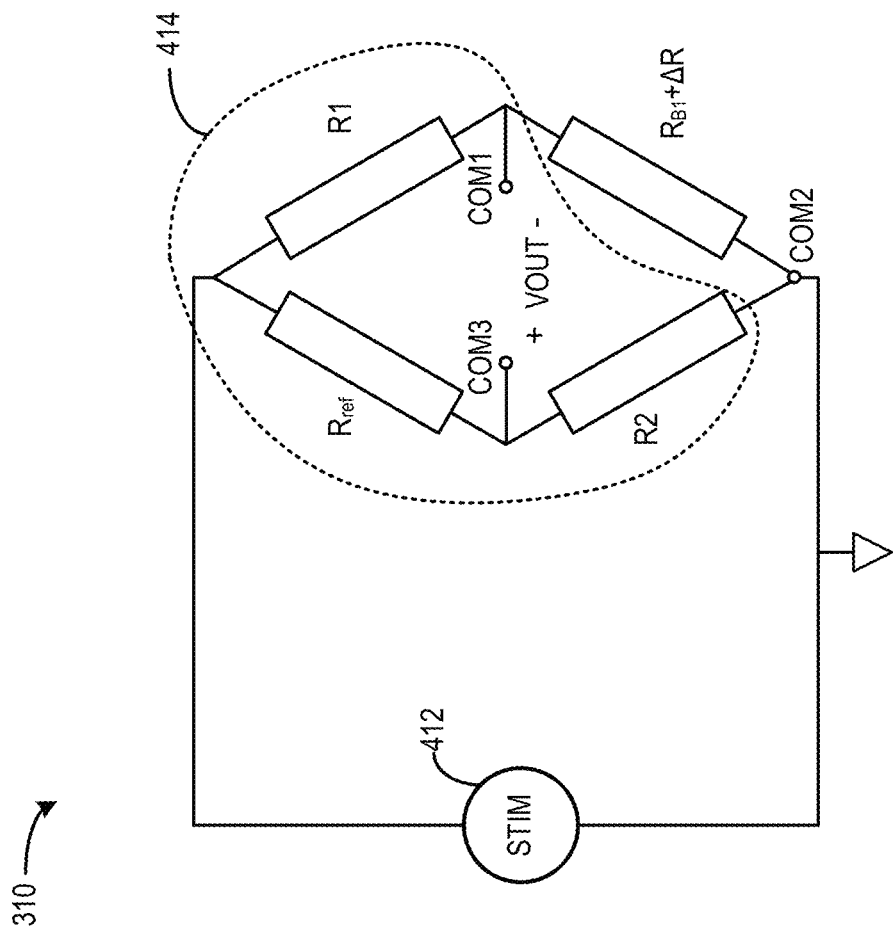

FIG. 5A illustrates another example of micro-mirror assembly 302a of FIG. 3A. As shown in FIG. 5A, micro-mirror assembly 302a includes micro-mirror 308 and connection structures 304a and 304b. As in FIG. 4A, each of connection structures 304a and 304b is connected to, respectively, COM1 and COM2 electrical contacts. But in FIG. 5A, connection structure 304b is also coated with a metal layer (e.g., silver), which reduces its electrical resistance. As a result, as shown in model 510, the COM2 electrical contact can be electrically shorted to connection structure 304a, which is represented by an electrical resistance $R_{B1}+\Delta R$. Referring to FIG. 5B, with measurement circuit 310 connected across electrical contacts COM1 and COM2, the VOUT output can represent a relationship between the electrical resistance $R_{B1}+\Delta R$ of connection structure 304a and reference resistor $R_{ref}$.

The arrangements in FIG. 5A and FIG. 5B can reduce the noise signal present in VOUT when micro-mirror 308 is static, as illustrated by graph 434 of FIG. 4D. As described above, the noise signal can be attributed to capacitive coupling of the sinusoidal driving voltage signal from the BIAS electrical contacts via capacitor $C_{BC}$ (representing pairs of fingers 402a-402d). As shown in FIG. 5A and FIG. 5B, with COM2 electrical contact connected to ground, the noise signal coupled via capacitor $C_{BC}$ can be conducted to ground. Therefore, the noise signal present in the VOUT output, due to capacitive coupling of the sinusoidal driving voltage signal, can be reduced or even eliminated.

Method

Figure 6:
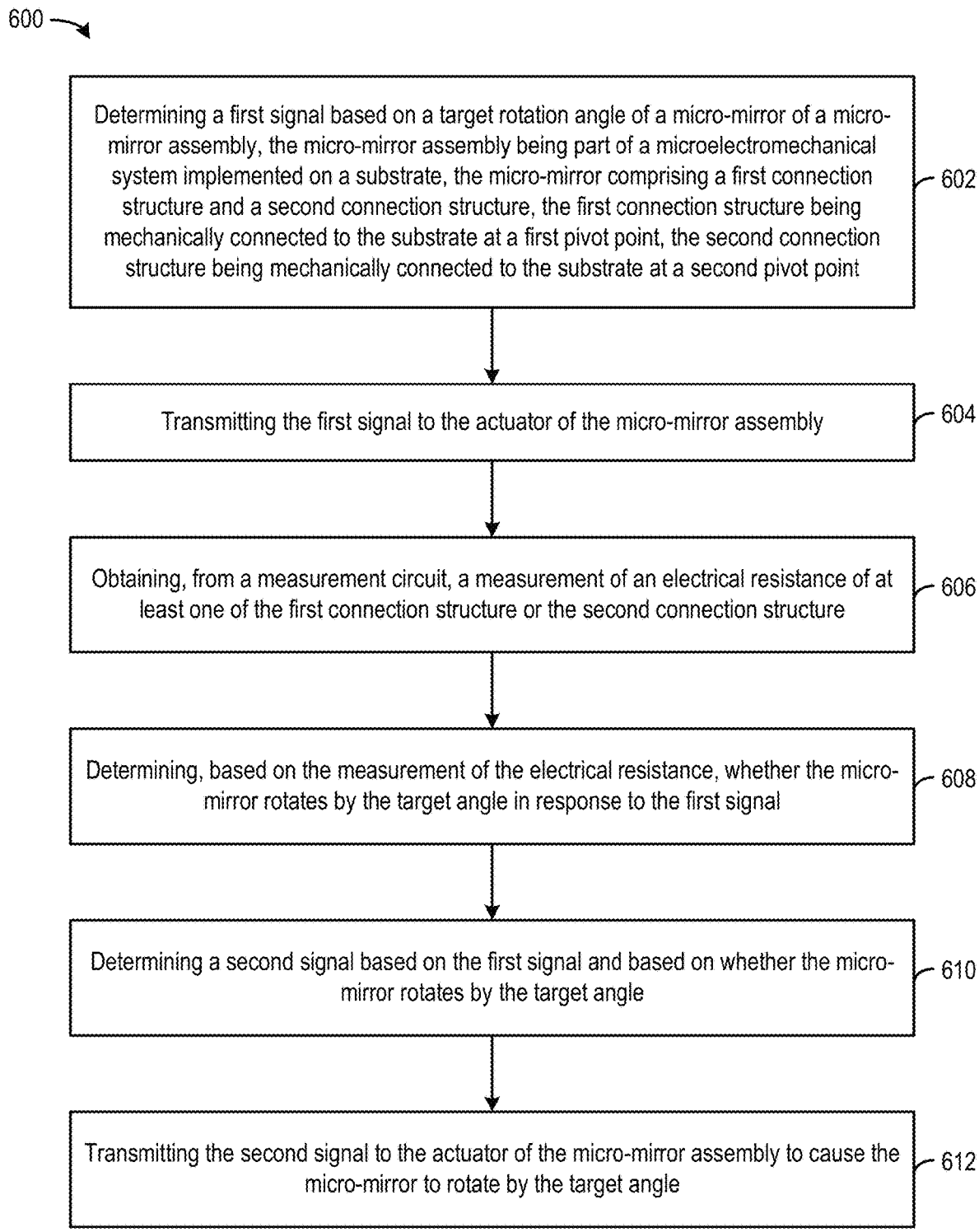
FIG. 6 illustrates a flowchart of a method of operating a mirror assembly, according to certain embodiments.

FIG. 6 illustrates a method 600 for performing light steering operation using a mirror assembly, such as mirror assembly 302 of FIGS. 3A-FIG. 5B. The micro-mirror assembly is part of an MEMS implemented on a substrate, such as substrate 255. The micro-mirror assembly comprises a micro-mirror (e.g., micro-mirror 308), a first connection structure (e.g., connection structures 304a), and a second connection structure (e.g., connection structures 304b), the first connection structure being mechanically connected to the substrate at a first pivot point (e.g., connection points 305a), the second connection structure being mechanically connected to the substrate at a second pivot point (e.g., connection points 305b). Method 600 can be performed by a controller, such as actuator controller 301, in conjunction with other components of micro-mirror assembly 302a, such as actuators 306 and measurement circuit 310. The measurement circuit is electrically connected to at least one of the first connection structure or the second connection structure and is configured to measure an electrical resistance of at least one of the first connection structure or the second connection structure.

In operation 602, the controller determines a first signal based on a target rotation angle of the micro-mirror. The first signal can be in the form of a voltage to be applied to the actuator. The magnitude/frequency of the first signal can be determined based on a torque required to achieve the target rotation angle, and a property of the actuator that determines a relationship between the voltage and the torque, as described above in Equations 1-4.

In operation 604, the controller can transmit the first signal to the actuator of the micro-mirror assembly to rotate the micro-mirror by the target angle. The actuator rotates the micro-mirror via, for example, an electrostatic force (e.g., a comb drive) or a mechanical push/pull force (e.g., a piezoelectric device).

In operation 606, the controller can obtain, from the measurement circuit, a measurement of an electrical resistance of the at least one of the first connection structure or the second connection structure. In some examples, as shown in FIG. 4A, an electrical resistance across the first connection structure, the micro-mirror, and the second connection structure can be obtained, with the electrical resistance dominated by the connection structures. In some examples, as shown in FIG. 5A, one of the first or second connection structures can be coated with a metal layer, such that the electrical resistance of the other one of the first or second connection structures is measured. In some examples, the electrical resistance can be measured by a bridge or a voltage divider structure that outputs a voltage based on a relationship between the electrical resistance and a reference resistance. The measurement circuit can measure the voltage using the electrical contacts on the substrate.

In operation 608, the controller can determine, based on the measurement of the electrical resistance, whether the micro-mirror rotates by the target angle in response to the first signal. The determination can be based on comparing the voltage from the bridge/voltage divider with a predetermined voltage for the target angle. A difference (if any) between the actual rotation angle of the micro-mirror and the target angle can also be determined.

In operation 610, the controller can determine a second signal based on the first signal and based on whether the micro-mirror rotates by the target angle. For example, the second signal can be determined based on adjusting the first signal until the difference between the actual rotation angle and the target angle falls below a threshold. In some examples, the adjustment of the control signal can include adjusting an amplitude of the control signal to adjust the torque provided by the actuator. In some examples, the micro-mirror may be rotated according to a periodic pattern. For example, the micro-mirror can be rotated at a frequency close to a natural frequency between a range of angles to induce harmonic resonance, which allows substantial reduction in the required torque to achieve a target FOV. In such a case, the adjustment of the control signal can include adjusting the frequency of the control signal.

In operation 612, the controller can transmit the second signal to the actuator of the micro-mirror assembly to cause the micro-mirror to rotate by the target angle. The controller can then obtain another measurement of the actual rotation angle of the micro-mirror and adjust the second signal to further reduce the difference between the actual rotation angle and the target angle.

Computing System

Figure 7:
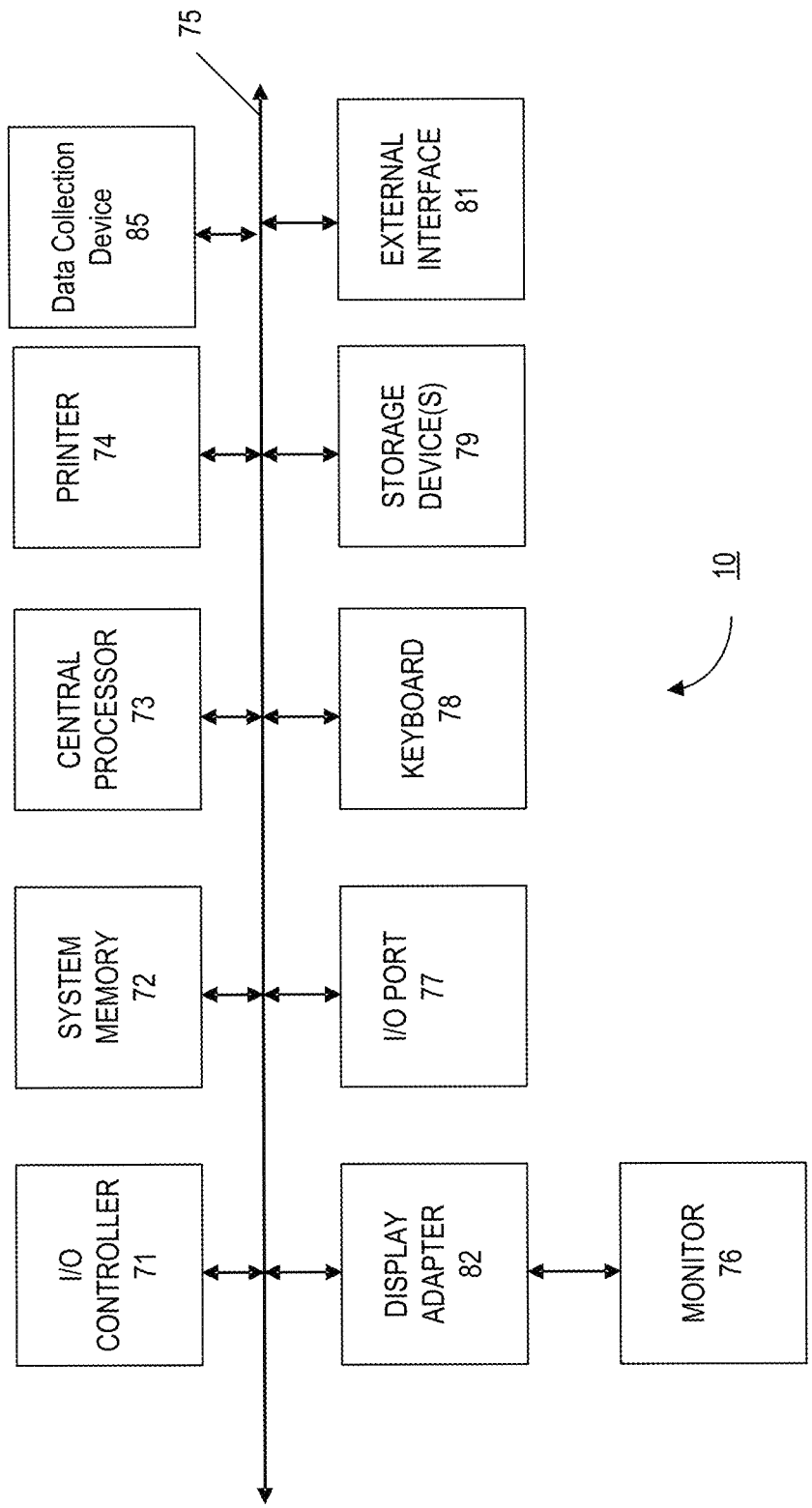
FIG. 7 illustrates an example computer system that may be utilized to implement techniques disclosed herein.

Any of the computing systems mentioned herein may utilize any suitable number of subsystems. Examples of such subsystems are shown in FIG. 7 in computing system 10. In some embodiments, a computing system includes a single computing apparatus, where the subsystems can be the components of the computing apparatus. In other embodiments, a computing system can include multiple computing apparatuses, each being a subsystem, with internal components. Computing system 10 can include, for example, a field-programmable gate array (FPGA), an application-specific integrated circuit (ASIC), and a general-purpose central processing unit (CPU), to implement the disclosed techniques, including the techniques described from FIG. 1-FIG. 6, such as actuator controller 301. In some examples, computing system 10 can also include desktop and laptop computers, tablets, mobile phones, and other mobile devices.

The subsystems shown in FIG. 7 are interconnected via a system bus 75. Additional subsystems such as a printer 74, keyboard 78, storage device(s) 79, monitor 76 which is coupled to display adapter 82, and others are shown. Peripherals and input/output (I/O) devices, which couple to I/O controller 71, can be connected to the computing system by any number of means known in the art, such as I/O port 77 (e.g., USB, FireWire®). For example, I/O port 77 or external interface 81 (e.g., Ethernet or Wi-Fi) can be used to connect computing system 10 to a wide-area network such as the Internet, a mouse input device, or a scanner. The interconnection via system bus 75 allows the central processor 73, which can be an FPGA, an ASIC, a CPU, etc., to communicate with each subsystem and to control the execution of a plurality of instructions from system memory 72 or the storage device(s) 79 (e.g., a fixed disk, such as a hard drive or optical disk), as well as the exchange of information between subsystems. The system memory 72 and/or the storage device(s) 79 may embody a computer-readable medium. Another subsystem is a data collection device 85, such as a camera, microphone, accelerometer, and the like. Any of the data mentioned herein can be output from one component to another component and can be output to the user.

A computing system can include a plurality of the same components or subsystems, e.g., connected together by external interface 81 or by an internal interface. In some embodiments, computing systems, subsystems, or apparatuses can communicate over a network. In such instances, one computer can be considered a client and another computer a server, where each can be part of a same computing system. A client and a server can each include multiple systems, subsystems, or components.

Aspects of embodiments can be implemented in the form of control-logic-using hardware (e.g., an ASIC or FPGA) and/or using computer software with a generally programmable processor in a modular or integrated manner. As used herein, a processor includes a single-core processor, a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language, such as, for example, Java, C, C++, C#, Objective-C, Swift, or scripting language such as Perl or Python using, for example, conventional or object-oriented techniques. The software code may be stored as a series of instructions or commands on a computer-readable medium for storage and/or transmission. A suitable non-transitory computer-readable medium can include random access memory (RAM), a read-only memory (ROM), a magnetic medium such as a hard-drive or a floppy disk, or an optical medium such as a compact disk (CD) or digital versatile disk (DVD), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium may be created using a data signal encoded with such programs. Computer-readable media encoded with the program code may be packaged with a compatible device or provided separately from other devices (e.g., via Internet download). Any such computer-readable medium may reside on or within a single computer product (e.g. a hard drive, a CD, or an entire computing system), and may be present on or within different computer products within a system or network. A computing system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a," "an," and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning including, but not limited to) unless otherwise noted. The term "connected" is to be construed as partly or wholly contained within, attached to, or joined together, even if there is something intervening. The phrase "based on" should be understood to be open-ended and not limiting in any way and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An apparatus comprising a light detection and ranging (LiDAR) module, the LiDAR module including:
    a semiconductor integrated circuit, the semiconductor integrated circuit including a microelectromechanical system (MEMS), a substrate on which the MEMS is formed, and a controller, the MEMS including one or more micro-mirror assemblies, each micro-mirror assembly including:
        a micro-mirror comprising a first connection structure and a second connection structure, the first connection structure being connected to the substrate at a first pivot point, the second connection structure being connected to the substrate at a second pivot point;
        an actuator configured to rotate the micro-mirror to reflect light emitted by a light source out of the LiDAR module or to reflect light received by the LiDAR module to a receiver; and
        a measurement circuit electrically connected to at least one of the first connection structure or the second connection structure, the measurement circuit being configured to measure an electrical resistance of at least one of the first connection structure or the second connection structure,
    wherein the controller is configured to, for each micro-mirror assembly:
        determine a first signal based on a target rotation angle of the micro-mirror;
        transmit the first signal to the actuator of the micro-mirror assembly to cause the micro-mirror to rotate to a first angle;
        obtain, from the measurement circuit, a measurement of the electrical resistance of at least one of the first connection structure or the second connection structure while the micro-mirror is at the first angle;
        determine, based on the measurement of the electrical resistance, an actual rotation angle of the micro-mirror in response to the first signal;
        determine a second signal based on a relationship between the target rotation angle and the actual rotation angle; and
        transmit the second signal to the actuator of the micro-mirror assembly, wherein the second signal causes the micro-mirror to rotate from the first angle to the target rotation angle.

2. The apparatus of claim 1, wherein the substrate comprises a pair of electrical contacts on two sides of the first pivot point and the second pivot point; and
    wherein the measurement circuit is electrically connected to at least one of the first connection structure or the second connection structure via one or more of the pair of electrical contacts.

3. The apparatus of claim 1, wherein the measurement circuit includes a network of resistors comprising a reference resistor; and
    wherein the measurement circuit further comprises a stimulus generator configured to supply a stimulus voltage to the network of resistors to generate a voltage output representing the measurement based on a relationship between the electrical resistance of at least one of the first connection structure or the second connection structure and an electrical resistance of the reference resistor.

4. The apparatus of claim 3, wherein the network of resistors and at least one of the first connection structure or the second connection structure form a bridge structure.

5. The apparatus of claim 3, wherein the stimulus generator is configured to generate a pulse-width modulation (PWM) signal as the stimulus voltage, the PWM signal having periodic on times and off times; and
    wherein the controller is configured to determine the actual rotation angle of the micro-mirror based on the measurement obtained during the on times of the PWM signal.

6. The apparatus of claim 3, wherein the measurement circuit includes:
    an amplifier configured to amplify the voltage output;
    an analog-to-digital converter (ADC) configured to convert the amplified voltage output to a digital value;
    a mapping table that maps multiple digital values to multiple rotation angles; and
    an output circuit configured to:
        access the mapping table to retrieve the actual rotation angle mapped to the digital value; and
        output the retrieved actual rotation angle.

7. The apparatus of claim 1, wherein the measurement circuit is configured to measure the electrical resistance of the first connection structure and the second connection structure.

8. The apparatus of claim 7, wherein neither the first connection structure nor the second connection structure is coated with a layer of metal.

9. The apparatus of claim 1, wherein the measurement circuit is configured to measure the electrical resistance of the first connection structure.

10. The apparatus of claim 9, wherein the first connection structure is not coated with a layer of metal; and
    wherein the second connection structure is coated with a layer of metal.

11. The apparatus of claim 1, wherein the controller is configured to generate the second signal based on adjusting at least one of: a frequency of the first signal or an amplitude of the first signal.

12. The apparatus of claim 1, wherein the actuator includes one of: an electrostatic actuator, an electromagnetic actuator, or a piezoelectric actuator.

13. The apparatus of claim 1, wherein the controller is configured to:
control the actuator of each micro-mirror assembly to rotate the micro-mirror of the respective micro-mirror assembly by the target rotation angle to set one of: an input path of light to a receiver or an output projection path of light from a light source.

14. The apparatus of claim 13, wherein the light source comprises a pulsed light source;
wherein the target rotation angle is a first target rotation angle; and
wherein the controller is configured to:
control the light source to generate a first light pulse at a first time;
control the actuator to set a first angle of the output projection path based on the first target rotation angle of the micro-mirror to project the first light pulse towards an object along the output projection path;
control the actuator of each micro-mirror assembly to set a second angle of the input path based on a second target rotation angle of the micro-mirror to steer a second light pulse reflected from the object to the receiver, the second light pulse being received at the receiver at a second time; and
determine a location of the object with respect to the apparatus based on a difference between the first time and the second time, as well as on the first angle and the second angle.

15. A method comprising:
determining a first signal based on a target rotation angle of a micro-mirror of a micro-mirror assembly, the micro-mirror assembly being part of an MEMS implemented on a substrate, the micro-mirror comprising a first connection structure and a second connection structure, the first connection structure being connected to the substrate at a first pivot point, the second connection structure being connected to the substrate at a second pivot point;
transmitting the first signal to the actuator of the micro-mirror assembly to rotate the micro-mirror by a first angle;
obtaining, from a measurement circuit, a measurement of an electrical resistance of at least one of the first connection structure or the second connection structure while the micro-mirror is at the first angle;
determining, based on the measurement of the electrical resistance, an actual rotation angle of the micro-mirror in response to the first signal;
determining a second signal based on the first signal and based on a relationship between the actual rotation angle and the target rotation angle; and
transmitting the second signal to the actuator of the micro-mirror assembly, wherein the second signal causes the micro-mirror to rotate from the first angle to the target rotation angle.

16. The method of claim 15, further comprising:
measuring, using the measurement circuit and via a pair of electrical contacts on two sides of the first pivot point and the second pivot point, the electrical resistance of at least one of the first connection structure or the second connection structure.

17. The method of claim 15, wherein the measurement circuit comprises a network of resistors comprising a reference resistor, and a stimulus generator; and
wherein the method further comprises controlling the stimulus generator to supply a stimulus voltage to the network of resistors, the stimulus voltage causing the network of resistors to generate a voltage output representing the measurement based on a relationship between the electrical resistance of at least one of the first connection structure or the second connection structure, and an electrical resistance of the reference resistor.

18. The method of claim 17, further comprising: controlling the stimulus generator is configured to generate a pulse-width modulation (PWM) signal as the stimulus voltage, the PWM signal having periodic on times and off times; and
wherein the actual rotation angle of the micro-mirror is determined based on the measurement obtained during the on times of the PWM signal.

19. The method of claim 17, wherein the measurement of the electrical resistance of one of the first connection structure or the second connection structure is obtained.

20. A non-transitory computer-readable medium storing instructions, which, when executed by a hardware processor, causes the hardware processor to:
determine a first signal based on a target rotation angle of a micro-mirror of a micro-mirror assembly, the micro-mirror assembly being part of an MEMS implemented on a substrate, the micro-mirror comprising a first connection structure and a second connection structure, the first connection structure being connected to the substrate at a first pivot point, the second connection structure being connected to the substrate at a second pivot point;
transmit the first signal to the actuator of the micro-mirror assembly to rotate the micro-mirror by a first angle;
obtain, from a measurement circuit, a measurement of an electrical resistance of at least one of the first connection structure or the second connection structure while the micro-mirror is at the first angle;
determine, based on the measurement of the electrical resistance, an actual rotation angle of the micro-mirror in response to the first signal;
determine a second signal based on the first signal and based on a relationship between the actual rotation angle and the target rotation angle; and
transmit the second signal to the actuator of the micro-mirror assembly, wherein the second signal causes the micro-mirror to rotate from the first angle to the target rotation angle.

* * * * *